(12) United States Patent
Miyamoto et al.

(10) Patent No.: US 10,592,019 B2
(45) Date of Patent: Mar. 17, 2020

(54) ELECTRONIC DEVICE

(71) Applicant: FUJITSU LIMITED, Kawasaki-shi, Kanagawa (JP)

(72) Inventors: Akinori Miyamoto, Sagamihara (JP); Yuichi Kamata, Isehara (JP); Kiyoshi Taninaka, Ebina (JP); Yasuhiro Endo, Ebina (JP)

(73) Assignee: FUJITSU LIMITED, Kawasaki (JP)

( * ) Notice: Subject to any disclaimer, the term of this patent is extended or adjusted under 35 U.S.C. 154(b) by 16 days.

(21) Appl. No.: 15/993,467

(22) Filed: May 30, 2018

(65) Prior Publication Data

US 2018/0275786 A1 Sep. 27, 2018

Related U.S. Application Data

(63) Continuation of application No. PCT/JP2015/084469, filed on Dec. 9, 2015.

(51) Int. Cl.
*G06F 3/041* (2006.01)
*G06F 3/01* (2006.01)

(52) U.S. Cl.
CPC .............. *G06F 3/041* (2013.01); *G06F 3/01* (2013.01); *G06F 3/016* (2013.01); *G06F 3/0416* (2013.01);
(Continued)

(58) Field of Classification Search
CPC . G06F 3/041; G06F 3/01; G06F 3/016; G06F 3/0416; G06F 2203/014; G06F 2203/04103
See application file for complete search history.

(56) References Cited

U.S. PATENT DOCUMENTS

2009/0085439 A1* 4/2009 Okuda .................... G01S 7/521
310/334
2011/0291976 A1 12/2011 Takada et al.
(Continued)

FOREIGN PATENT DOCUMENTS

JP 2010-238222 10/2010
JP 2013-097438 5/2013
(Continued)

OTHER PUBLICATIONS

International Search Report of Int. Appl. No. PCT/JP2015/084469 dated Feb. 16, 2016.
(Continued)

*Primary Examiner* — William Boddie
*Assistant Examiner* — Saifeldin E Elnafia
(74) *Attorney, Agent, or Firm* — Maschoff Brennan

(57) ABSTRACT

An electronic device includes: a top panel having a manipulation surface; a position detector configured to detect a position of a manipulation input performed on the manipulation surface; a vibrating element; and a drive controlling part configured to drive the vibrating element for generating a natural vibration in an ultrasound frequency band at the manipulation surface such that an intensity of the natural vibration is changed in accordance with the position of the manipulation input performed on the manipulation surface and a time change degree of the position, wherein a width of the vibrating element in a direction in which an amplitude of the natural vibration changes is set based on a ratio between a flexural rigidity of the top panel and a flexural rigidity of the top panel and the vibrating element at a portion where the vibrating element is attached to the top panel.

3 Claims, 24 Drawing Sheets

(52) U.S. Cl.
CPC ............... *G06F 2203/014* (2013.01); *G06F 2203/04103* (2013.01)

(56) References Cited

U.S. PATENT DOCUMENTS

| | | | |
|---|---|---|---|
| 2014/0347322 | A1 | 11/2014 | Kamata et al. |
| 2016/0170539 | A1 | 6/2016 | Watanabe et al. |

FOREIGN PATENT DOCUMENTS

| | | |
|---|---|---|
| JP | 2013-228885 | 11/2013 |
| JP | 5780368 | 9/2015 |
| WO | 2010/104019 | 9/2010 |
| WO | 2015/005103 | 1/2015 |

OTHER PUBLICATIONS

Takeyuki Dohda et al., "The Printed-matter Typecasting Method for Haptic Feel Design and Sticky-band Illusion", The collection of papers of the 11th SICE system integration division annual conference (SI2010, Sendai), Dec. 2010, pp. 174 to 177 Abstract.

Masashi Nakatani et al., "The Fishbone Tactile Illusion", Collection of papers of the 10th Congress of the Virtual Reality Society of Japan, Sep. 2005.

Toshihiro Irie, "Theory of Mechanical Vibrations, 2nd Edition", pp. 122-127 translation of the relevant part.

Michael Wiertlewski et al., "Power Optimization of Ultrasonic Friction-Modulation Tactile Interfaces", IEEE Transactions on Haptics, vol. 8, No. 1, Jan.-Mar. 2015, pp. 43-53.

Extended European search report dated Nov. 16, 2018 issued with respect to the corresponding European patent application No. 15910208.6.

Written Opinion of Int. Appl. No. PCT/JP2015/084469 dated Feb. 16, 2016.

Toshihiro Irie, "Theory of Mechanical Vibrations, 2nd Edition", pp. 122-127, published Apr. 10, 1981 translation of the relevant part.

\* cited by examiner

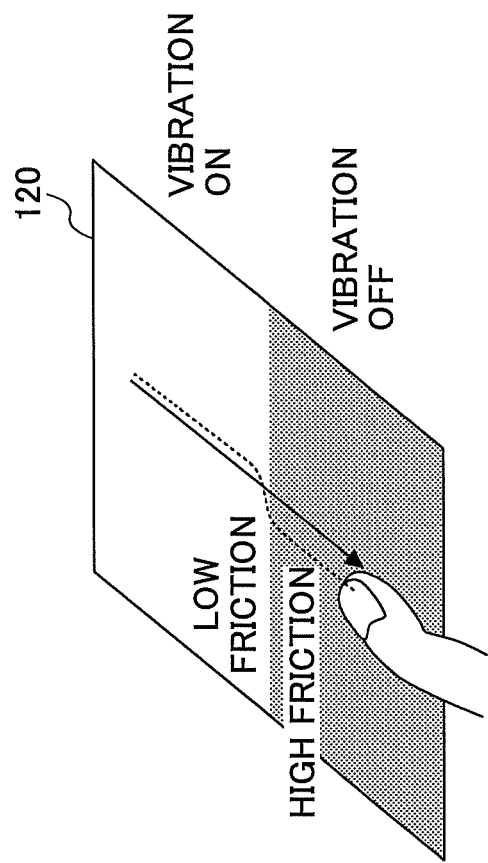
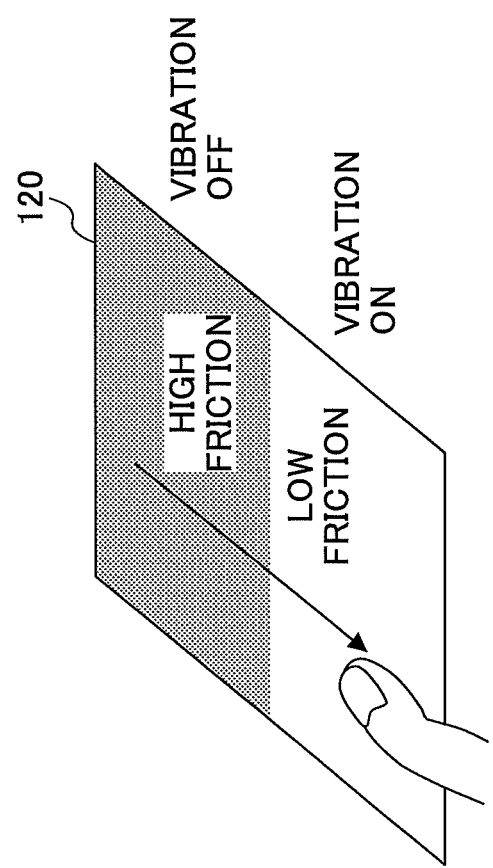
FIG.5A
FIG.5B

FIG.8

| APPLICATION ID | AREA DATA | VIBRATION PATTERN |
|---|---|---|
| 1 | f1=(X,Y) | P1 |
| 1 | f2=(X,Y) | P2 |
| 1 | f3=(X,Y) | P3 |
| 1 | f4=(X,Y) | P4 |
| | | |

ELECTRONIC DEVICE

CROSS-REFERENCE TO RELATED APPLICATION

This application is a continuation application of International Application PCT/JP2015/084469 filed on Dec. 9, 2015 and designated the U.S., the entire contents of which are incorporated herein by reference.

FIELD

The embodiments discussed herein relate to an electronic device.

BACKGROUND

Conventionally, there exists a touch panel device that includes: a coordinate input surface; an operation component generation part that generates an operation component to be displayed on a display part located below the coordinate input surface as an image; a vibration generation part that generates vibration for vibrating the coordinate input surface; and a drive control part that controls drive of the vibration generation part. The drive control part controls drive of the vibration generation part according to a drive pattern that generates a standing wave having a waveform corresponding to a position of the operation component (see Patent Document 1, for example).

RELATED-ART DOCUMENTS

Patent Documents

[Patent Document 1] Japanese Laid-open Patent Publication No. 2010-238222

In the conventional touch panel apparatus, the vibration generation part is attached to a surface substrate. Within the surface substrate, because the rigidity of a portion to which the vibration generation part is attached and the rigidity of a portion to which the vibration generation part is not attached differ, the vibration characteristics differ.

However, such a difference in rigidity is not considered for the conventional touch panel apparatus.

Hence, there is a possibility that the conventional touch panel apparatus cannot provide a favorable tactile sensation.

SUMMARY

According to an embodiment of the present invention, an electronic device includes: a top panel having a manipulation surface; a position detector configured to detect a position of a manipulation input performed on the manipulation surface; a vibrating element attached to the top panel and configured to generate a vibration at the manipulation surface; and a drive controlling part configured to drive the vibrating element by using a driving signal for generating a natural vibration in an ultrasound frequency band at the manipulation surface, the drive controlling part being configured to drive the vibrating element such that an intensity of the natural vibration is changed in accordance with the position of the manipulation input performed on the manipulation surface and a time change degree of the position, wherein a width of the vibrating element in a direction in which an amplitude of the natural vibration changes is set based on a ratio between a flexural rigidity of the top panel and a flexural rigidity of the top panel and the vibrating element at a portion where the vibrating element is attached to the top panel.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIGS. 5A and 5B are diagrams illustrating cases where a kinetic friction force applied to a user's fingertip performing a manipulation input is varied by the natural vibration in the ultrasound frequency band generated at the top panel of the electronic device;

FIG. 8 is a diagram illustrating the data stored in the memory;

DESCRIPTION OF EMBODIMENT

Hereinafter, an embodiment to which electronic devices of the present invention are applied will be described. An object is to provide an electronic apparatus that can provide a favorable tactile sensation.

EMBODIMENT

Figure 1:
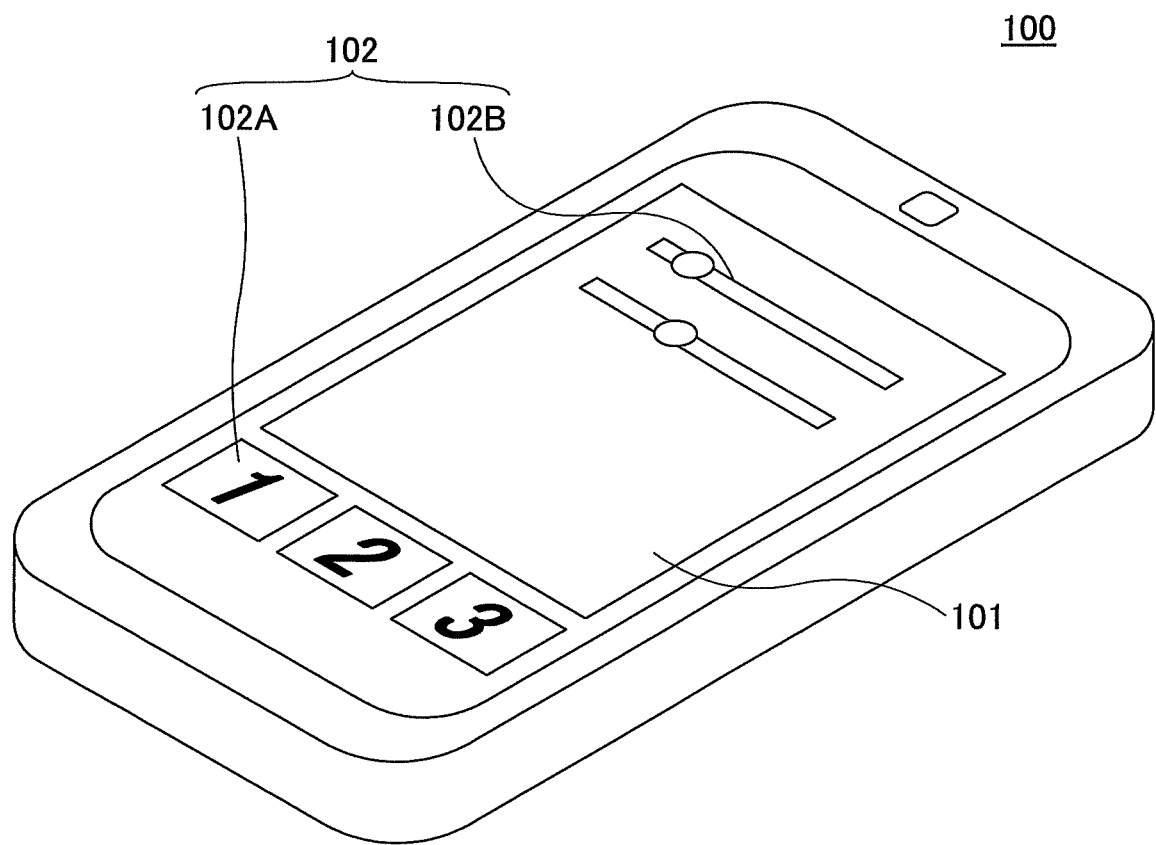
FIG. 1 is a perspective view illustrating an electronic device according to an embodiment.

FIG. 1 is a perspective view illustrating an electronic device 100 according to an embodiment.

For example, the electronic device 100 is a smartphone terminal device, a tablet computer, a game machine, or the like that has a touch panel as a manipulation input part. The electronic device 100 may be any device as long as the device has a touch panel as a manipulation input part. Accordingly, the electronic device 100 may be a device such as a portable-type information terminal device, or an Automatic Teller Machine (ATM) placed at a specific location to be used, for example. Also, the electronic device 100 may be an input device for a vehicle.

For a manipulation input part 101 of the electronic device 100, a display panel is disposed under the touch panel, and various buttons including a button 102A, a slider 102B, and the like (hereinafter referred to as Graphic User Interface (GUI) manipulation part(s) 102) are displayed on the display panel.

A user of the electronic device 100 ordinarily touches the manipulation input part 101 by his or her fingertip(s) in order to manipulate the GUI manipulation part 102.

Next, a detailed configuration of the electronic device 100 will be described with reference to FIG. 2.

Figure 2:
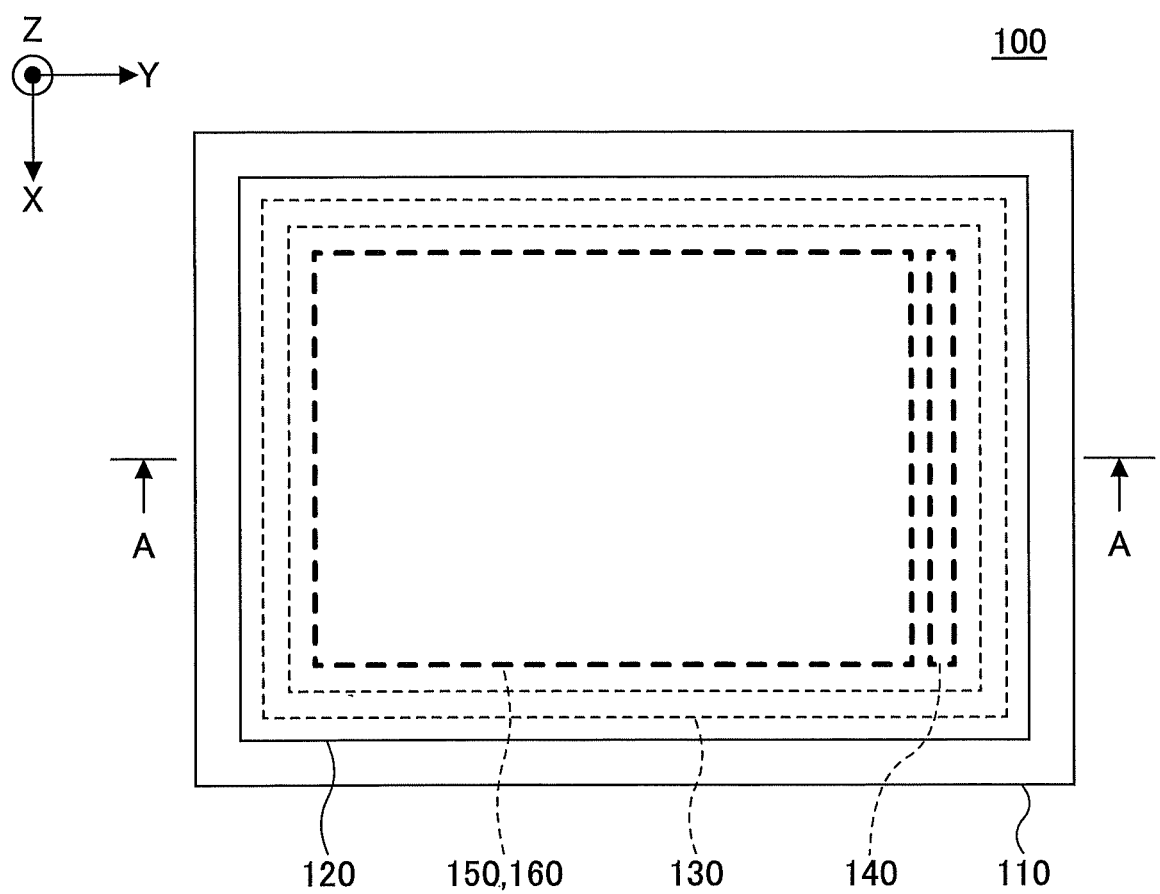
FIG. 2 is a plan view illustrating the electronic device according to the embodiment.
Figure 3:
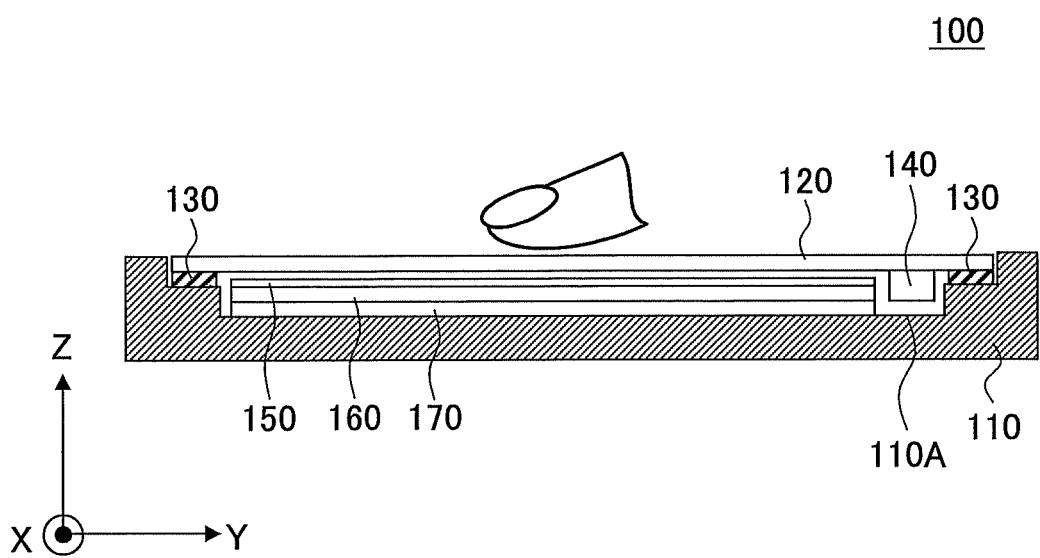
FIG. 3 is a cross-sectional view of the electronic device taken along a line A-A of FIG. 2.

FIG. 2 is a plan view illustrating the electronic device 100 of the embodiment. FIG. 3 is a diagram illustrating a cross-sectional view of the electronic device 100 taken along a line A-A of FIG. 2. It should be noted that an XYZ coordinate system that is an orthogonal coordinate system is defined as illustrated in FIGS. 2 and 3.

The electronic device 100 includes a housing 110, the top panel 120, a double-faced adhesive tape 130, a vibrating element 140, the touch panel 150, the display panel 160, and a substrate 170.

The housing 110 is made of a plastic, for example. As illustrated in FIG. 3, the substrate 170, the display panel 160 and the touch panel 150 are disposed in a recessed portion 110A of the housing 110, and the top panel 120 is bonded on the housing 110 by the double-faced adhesive tape 130.

The top panel 120 is a thin flat-plate member having a rectangular shape in plan view, and is made of transparent glass or a reinforced plastic such as polycarbonate. A surface of the top panel 120 (a positive side surface in the Z axis direction) is one example of a manipulation surface on which the user of the electronic device 100 performs a manipulation input.

The vibrating element 140 is bonded on a negative side surface of the top panel 120 in the Z axis direction, and the four sides in plan view of the top panel 120 are bonded on the housing 110 by the double-faced adhesive tape 130. It should be noted that the double-faced adhesive tape 130 is not necessarily a rectangular-ring-shaped member in plan view as illustrated in FIG. 3, as long as the double-faced adhesive tape 130 can bond the four sides of the top panel 120 to the housing 110.

The touch panel 150 is disposed on the negative side in the Z axis direction of the top panel 120. The top panel 120 is provided in order to protect the surface of the touch panel 150. It should be noted that another panel, protection film or the like may be provided on the surface of the top panel 120.

In a state in which the vibrating element 140 is bonded on the negative side surface of the top panel 120 in the Z axis direction, the top panel 120 is vibrated by driving the vibrating element 140. In the embodiment, a standing wave is generated at the top panel 120 by causing the top panel 120 to vibrate at a natural vibration frequency of the top panel 120. However, because the vibrating element 140 is bonded on the top panel 120, it is preferable to determine the natural vibration frequency in consideration of a weight of the vibrating element 140 and the like, in practice.

The vibrating element 140 is bonded on the negative side surface of the top panel 120 in the Z axis direction, at a positive side in the Y axis direction, along the short side extending in the X axis direction. The vibrating element 140 may be any element as long as it can generate vibration in an ultrasound frequency band. A piezoelectric element such as a piezo element may be used as the vibrating element 140, for example.

The vibrating element 140 is driven in accordance with a driving signal output from a drive controlling part which will be described later. A frequency and an amplitude (intensity) of the vibration generated by the vibrating element 140 are set by the driving signal. Further, on/off of the vibrating element 140 is controlled in accordance with the driving signal.

It should be noted that the ultrasound frequency band is a frequency band that is higher than or equal to approximately 20 kHz, for example. According to the electronic device 100 of the embodiment, the frequency at which the vibrating element 140 vibrates is equal to a number of vibrations per unit time (frequency) of the top panel 120. Accordingly, the vibrating element 140 is driven in accordance with the driving signal such that the vibrating element 140 vibrates at a number of natural vibrations per unit time (natural vibration frequency) of the top panel 120.

The touch panel 150 is disposed on (the positive side in the Z axis direction of) the display panel 160 and is disposed under (the negative side in the Z axis direction of) the top panel 120. The touch panel 150 is one example of a coordinate detector that detects a position at which the user of the electronic device 100 touches the top panel 120 (in the following, the position is referred to as a position of the manipulation input).

Various Graphic User Interface (GUI) buttons or the like (hereinafter referred to as GUI manipulation part(s)) are displayed on the display panel 160 located under the touch panel 150. Therefore, the user of the electronic device 100 ordinarily touches the top panel 120 by his or her fingertip(s) in order to manipulate the GUI manipulation part.

The touch panel 150 is any coordinate detector as long as it can detect the position of the manipulation input on the top panel 120 performed by the user. The touch panel 150 may be a capacitance type coordinate detector or a resistance film type coordinate detector, for example. Here, the embodiment in which the touch panel 150 is a capacitance type coordinate detector will be described. The capacitance type touch panel 150 can detect the manipulation input performed on the top panel 120 even if there is a clearance gap between the touch panel 150 and the top panel 120.

Also, although the top panel 120 is disposed on the input surface side of the touch panel 150 in the described embodiment, the top panel 120 may be integrated with the touch panel 150. In this case, the surface of the touch panel 150 is equal to the surface of the top panel 120 illustrated in FIGS. 2 and 3, and the surface of the touch panel 150 constitutes the manipulation surface. The top panel 120 illustrated in FIGS. 2 and 3 may be omitted. In this case, the surface of the touch panel 150 constitutes the manipulation surface. In this case, a member having the manipulation surface may be vibrated by a natural vibration of the member.

In a case where the touch panel 150 is of resistance film type, the touch panel 150 may be disposed on the top panel 120. In this case also, the surface of the touch panel 150 constitutes the manipulation surface. Also, the top panel 120 illustrated in FIGS. 2 and 3 may be omitted. In this case also, the surface of the touch panel 150 constitutes the manipulation surface. In this case, a member having the manipulation surface may be vibrated at a natural vibration by of the member.

The display panel 160 may be a display part that can display an image. The display panel 160 may be a liquid crystal display panel, an organic Electroluminescence (EL) panel or the like, for example. Inside the recessed portion 110A of the housing 110, the display panel 160 is arranged on (the positive side in the Z axis direction of) the substrate 170 using a holder or the like whose illustration is omitted.

The display panel 160 is driven and controlled by a driver Integrated Circuit (IC), which will be described later, and displays a GUI manipulation part, an image, characters, symbols, graphics, and/or the like in accordance with an operating state of the electronic device 100.

The substrate 170 is disposed inside the recessed portion 110A of the housing 110. The display panel 160 and the touch panel 150 are disposed on the substrate 170. The display panel 160 and the touch panel 150 are fixed to the substrate 170 and the housing 110 by a holder or the like (not shown).

On the substrate 170, a drive controlling apparatus, which will be described later, and various circuits and the like that are necessary for driving the electronic device 100 are mounted.

According to the electronic device 100 having the configuration as described above, when the user touches the top panel 120 with his or her fingertip and a movement of his or her fingertip is detected, the drive controlling part mounted on the substrate 170 drives the vibrating element 140 to vibrate the top panel 120 at a frequency in the ultrasound frequency band. This frequency in the ultrasound frequency band is a resonance frequency of a resonance system including the top panel 120 and the vibrating element 140 and generates a standing wave at the top panel 120.

The electronic device 100 generates the standing waves in the ultrasound frequency band to provide tactile sensations to the user through the top panel 120.

Next, a standing wave generated at the top panel 120 will be described with reference to FIGS. 4A and 4B.

Figures 4A, 4B:
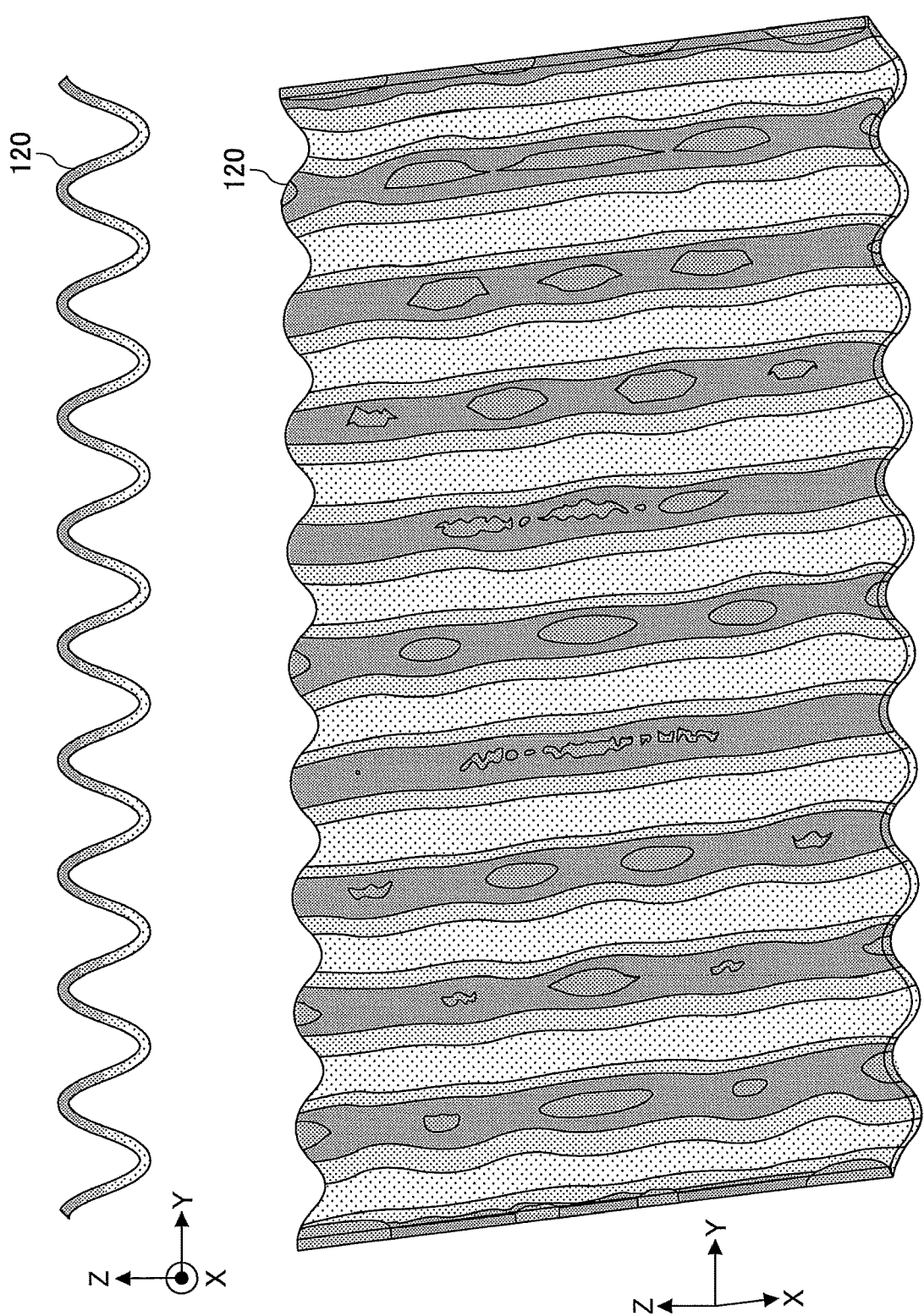
FIGS. 4A and 4B are diagrams illustrating crests formed in parallel with a short side of a top panel included in a standing wave generated at the top panel by a natural vibration in an ultrasound frequency band.

FIGS. 4A and 4B are diagrams illustrating crests formed parallel with the short side of the top panel 120 included in the standing wave generated at the top panel 120 by the natural vibration in the ultrasound frequency band. FIG. 4A is a side view, and FIG. 4B is a perspective view. In FIGS. 4A and 4B, a XYZ coordinate system similar to that of FIGS. 2 and 3 is defined. It should be noted that in FIGS. 4A and 4B, the amplitude of the standing wave is overdrawn in an easy-to-understand manner. Also, the vibrating element 140 is omitted in FIGS. 4A and 4B.

The natural vibration frequency (the resonance frequency) f of the top panel 120 is represented by the following formulas (1) and (2) where E is the Young's modulus of the top panel 120, p is the density of the top panel 120, δ is the Poisson's ratio of the top panel 120, l is the long side dimension of the top panel 120, t is the thickness of the top panel 120, and k is a periodic number of the standing wave along the direction of the long side of the top panel 120. Because the standing wave has the same waveform in every half cycle, the periodic number k takes values at intervals of 0.5, therefore at 0.5, 1, 1.5, 2 . . . .

$$f = \frac{\pi k^2 t}{l^2} \sqrt{\frac{E}{3\rho(1-\delta^2)}} \tag{1}$$

$$f = \alpha k^2 \tag{2}$$

It should be noted that the coefficient α included in formula (2) corresponds to coefficients other than $k^2$ included in formula (1).

A waveform of the standing wave illustrated FIGS. 4A and 4B is a waveform of a case where the periodic number k is 10, for example. In a case where a sheet of Gorilla (registered trademark) glass of which the length l of the long side is 140 mm, the length of the short side is 80 mm, and the thickness t is 0.7 mm is used as the top panel 120, for example, the natural vibration frequency f is 33.5 kHz when the periodic number k is 10. In this case, a driving signal whose frequency is 33.5 kHz may be used.

The top panel 120 is a planar member. When the vibrating element 140 (see FIGS. 2 and 3) is driven to generate the natural vibration in the ultrasound frequency band at the top panel 120, the top panel 120 deflects as illustrated in FIGS. 4A and 4B. As a result, a standing wave of bending vibration is generated at the top panel 120.

In the described embodiment, the single vibrating element 140 is bonded, on the negative side surface of the top panel 120 in the Z axis direction, at the location along the short side, which extends in the X axis direction, at the positive side in the Y axis direction. However, the electronic device 100 may use two vibrating elements 140. In a case where the electronic device 100 uses two vibrating elements 140, another vibrating element 140 may be bonded, on the negative side surface of the top panel 120 in the Z axis direction, at a location along the short side, which extends in the X axis direction, at a negative side in the Y axis direction. In this case, the two vibrating elements 140 may be axisymmetrically disposed with respect to a center line of the top panel 120 parallel to the two short sides of the top panel 120.

Further, in a case where the electronic device 100 drives two vibrating elements 140, the two vibrating elements 140 may be driven in the same phase because it is a symmetric mode, if the periodic number k is an integer number. If the periodic number k is a decimal number (which is a number having an integer part and a decimal part), the two vibrating elements 140 may be driven in opposite phases because it is an antisymmetric mode.

FIGS. 5A and 5B are diagrams illustrating cases where a kinetic friction force applied to a user's fingertip performing a manipulation input is varied by the natural vibration in the ultrasound frequency band generated at the top panel 120 of the electronic device 100. In FIGS. 5A and 5B, while touching the top panel 120 with his or her fingertip, the user performs the manipulation input by moving his or her fingertip along the arrow from a far side to a near side of the top panel 120. It should be noted that the vibration is turned on/off by turning on/off the vibrating element 140 (see FIGS. 2 and 3).

In FIGS. 5A and 5B, areas which the user's finger touches while the vibration is off are indicated in grey, with respect to the depth direction of the top panel 120. Areas which the user's finger touches while the vibration is on are indicated in white, with respect to the depth direction of the top panel 120.

As illustrated in FIGS. 4A and 4B, the natural vibration in the ultrasound frequency band occurs in the entire top panel 120. FIGS. 5A and 5B illustrate operation patterns in which on/off of the vibration is switched while the user's finger is tracing the top panel 120 from the far side to the near side.

Accordingly, in FIGS. 5A and 5B, the areas which the user's finger touches while the vibration is off are indicated in grey, and the areas which the user's finger touches while the vibration is on are indicated in white.

In the operation pattern illustrated in FIG. 5A, the vibration is off when the user's finger is located on the far side of the top panel 120, and the vibration is turned on in the process of moving the user's finger toward the near side.

Conversely, in the operation pattern illustrated in FIG. 5B, the vibration is on when the user's finger is located on the far side of the top panel 120, and the vibration is turned off in the process of moving the user's finger toward the near side.

Here, when the natural vibration in the ultrasound frequency band is generated at the top panel 120, a layer of air is interposed between the surface of the top panel 120 and the user's finger. The layer of air is provided by a squeeze effect. Thus, a kinetic friction coefficient on the surface of the top panel 120 is decreased when the user traces the surface with the user's finger.

Accordingly, in the grey area located on the far side of the top panel 120 illustrated in FIG. 5A, the kinetic friction force applied to the user's fingertip increases. In the white area located on the near side of the top panel 120, the kinetic friction force applied to the user's fingertip decreases.

Therefore, a user who is performing the manipulation input on the top panel 120 as illustrated in FIG. 5A senses a decrease of the kinetic friction force applied to the user's fingertip when the vibration is turned on. As a result, the user senses a slippery or smooth touch (texture) with his or her fingertip. In this case, the user senses as if a concave portion were present on the surface of the top panel 120, when the surface of the top panel 120 becomes smoother and the kinetic friction force decreases.

Conversely, in the white area located on the far side of the top panel 120 illustrated in FIG. 5B, the kinetic friction force applied to the user's fingertip decreases. In the grey area located on the near side of the top panel 120, the kinetic friction force applied to the user's fingertip increases.

Therefore, a user who is performing the manipulation input on the top panel 120 as illustrated in FIG. 5B senses an increase of the kinetic friction force applied to the user's fingertip when the vibration is turned off. As a result, the user senses a grippy or scratchy touch (texture) with his or her fingertip. In this case, the user senses as if a convex portion were present on the surface of the top panel 120, when the user's fingertip becomes grippy and the kinetic friction force increases.

As described above, the user can feel a concavity and convexity with his or her fingertip in the cases as illustrated in FIGS. 5A and 5B. For example, "The Printed-matter Typecasting Method for Haptic Feel Design and Sticky-band Illusion" (the Collection of papers of the 11th SICE system integration division annual conference (SI2010, Sendai)_ 174-177, 2010-12) discloses that a person can sense a concavity or a convexity. "Fishbone Tactile Illusion" (Collection of papers of the 10th Congress of the Virtual Reality Society of Japan (September, 2005)) also discloses that a person can sense a concavity or a convexity.

Although a variation of the kinetic friction force when the vibration is switched on/off is described above, a variation of the kinetic friction force is similarly obtained when the amplitude (intensity) of the vibrating element 140 is varied.

Next, a standing wave generated at the top panel 120 will be described with reference to FIG. 6.

Figure 6:
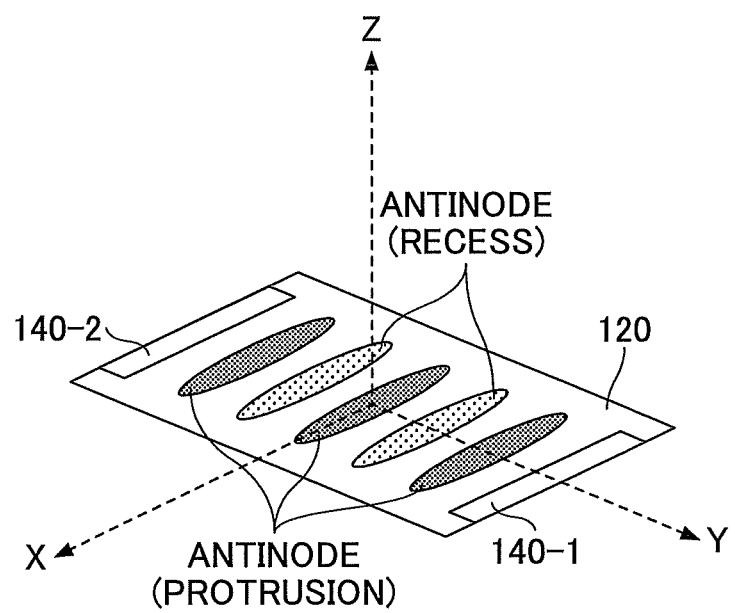
FIG. 6 is a diagram that describes a standing wave generated at the top panel.

FIG. 6 is a diagram that describes a standing wave generated at the top panel 120. In FIG. 6, a XYZ coordinate system similar to that of FIG. 2 to FIG. 4 is defined.

It is assumed that vibrating elements 140-1 and 140-2 are provided on the top panel 120. The vibrating element 140-1 is similar to the vibrating element 140 illustrated in FIGS. 2 and 3, and the vibrating element 140-2 is disposed, along the X axis, at the negative side end part of the top panel 120 in the Y axis direction. That is, the vibrating element 140-2 is disposed along the opposite side with respect to the side of the top panel 120 along which the vibrating element 140-1 is disposed.

Here, it is assumed that the vibrating elements 140-1 and 140-2 are driven at the same phase, and protruding antinodes indicated in dark gray and recessed antinodes indicated in light gray occur at a certain timing at the top panel 120. The protruding antinodes indicated in dark gray and the recessed antinodes indicated in light gray are assumed to be obtained when the amplitude is at the maximum.

Note that at a timing different from the timing illustrated in FIG. 6 by a half period of the natural vibration of the standing wave, recessed antinodes having the maximum amplitude occur at the portions of the protruding antinodes indicated in dark gray in FIG. 6, and protruding antinodes having the maximum amplitude occur at the portions of the recessed antinodes indicated in light gray in FIG. 6.

Next, a configuration of the electronic device 100 of the embodiment will be described with reference to FIG. 7.

Figure 7:
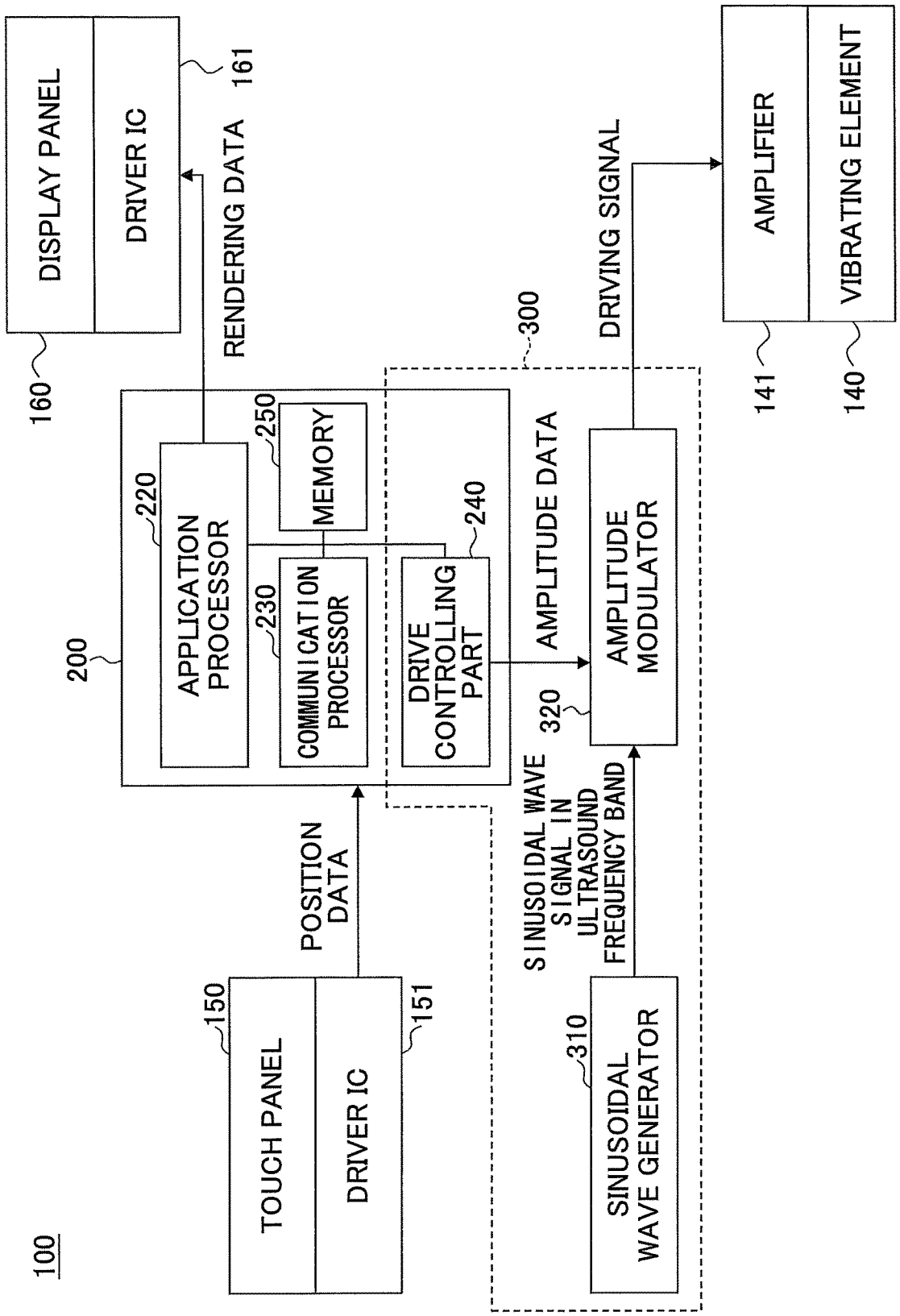
FIG. 7 is a diagram illustrating a configuration of the electronic device according to the embodiment.

FIG. 7 is a diagram illustrating the configuration of the electronic device 100 of the embodiment.

The electronic device 100 includes the vibrating element 140, an amplifier 141, the touch panel 150, a driver Integrated Circuit (IC) 151, the display panel 160, a driver IC 161, a controlling part 200, a sinusoidal wave generator 310, and an amplitude modulator 320.

The controlling part 200 includes an application processor 220, a communication processor 230 a drive controlling part 240, and a memory 250. The controlling part 200 is realized by an IC chip, for example.

The drive controlling part 240, the memory 250, the application processor 220, the sinusoidal wave generator 310, and the amplitude modulator 320 constitute a drive controlling apparatus 300. Note that although the application processor 220, the communication processor 230, the drive controlling part 240, and the memory 250 are realized by one controlling part 200 in the embodiment described here, the drive controlling part 240 may be disposed outside the controlling part 200 as another IC chip or processor. In this case, data that is necessary for drive control of the drive controlling part 240 among data stored in the memory 250, may be stored in a memory other than the memory 250 and may be provided inside the drive controlling apparatus 300.

In FIG. 7, the housing 110, the top panel 120, the double-faced adhesive tape 130, and the substrate 170 (see FIG. 2) are omitted. Here, the amplifier 141, the driver IC 151, the driver IC 161, the drive controlling part 240, the memory 250, the sinusoidal wave generator 310, and the amplitude modulator 320 will be described.

The amplifier 141 is disposed between the drive controlling apparatus 300 and the vibrating element 140. The amplifier 141 amplifies the driving signal output from the drive controlling apparatus 300 to drive the vibrating element 140.

The driver IC 151 is coupled to the touch panel 150. The driver IC 151 detects position data that represents a position on the touch panel 150 at which a manipulation input is performed, and outputs the position data to the controlling part 200. As a result, the position data is input to the application processor 220 and the drive controlling part 240. Note that inputting the position data to the drive controlling part 240 is equivalent to inputting the position data to the drive controlling apparatus 300.

The driver IC 161 is coupled to the display panel 160. The driver IC 161 inputs rendering data, output from the drive controlling apparatus 300, to the display panel 160 and causes the display panel 160 to display an image that is based on the rendering data. In this way, a GUI manipulation part, an image, or the like based on the rendering data is displayed on the display panel 160.

The application processor 220 performs processes for executing various applications of the electronic device 100.

The communication processor 230 executes necessary processes such that the electronic device 100 performs communications such as 3G (Generation), 4G (Generation), LTE (Long Term Evolution), and WiFi.

The drive controlling part 240 outputs amplitude data to the amplitude modulator 320 in a case where two predetermined conditions are satisfied. The amplitude data is data that represents amplitude value(s) for adjusting an intensity of a driving signal used to drive the vibrating element 140. The amplitude value(s) is set in accordance with a time change degree of the position data. Here, a speed of the user's fingertip moving along the surface of the top panel 120 is used as the time change degree of the position data. The drive controlling part 240 may calculate the moving speed of the user's fingertip based on a time change degree of the position data input from the driver IC 151.

The drive controlling apparatus 300 of the embodiment causes the top panel 120 to vibrate in order to vary the kinetic friction force applied to the user's fingertip when the user's fingertip moves along the surface of the top panel 120. Because the kinetic friction force occurs when the user's fingertip is in motion, the drive controlling part 240 causes the vibrating element 140 to vibrate when the moving speed becomes greater than or equal to a predetermined threshold speed. The first predetermined condition is that the moving speed is greater than or equal to the predetermined threshold speed.

Accordingly, the amplitude value represented by the amplitude data output from the drive controlling part 240 is zero in a case where the moving speed is less than the predetermined threshold speed. The amplitude value is set to be a predetermined amplitude value corresponding to the moving speed in a case where the moving speed becomes greater than or equal to the predetermined threshold speed. When the moving speed is greater than or equal to the predetermined threshold speed, the amplitude value is set to be smaller as the moving speed increases, and the amplitude value is set to be larger as the moving speed decreases.

The drive controlling apparatus 300 of the embodiment outputs the amplitude data to the amplitude modulator 320 in a case where the position of the user's fingertip performing the manipulation input is within a predetermined area in which a vibration is to be generated. The second predetermined condition is that the position of the user's fingertip performing the manipulation input is within the predetermined area in which the vibration is to be generated.

It is determined whether the position of the user's fingertip performing the manipulation input is within the predetermined area, in which a vibration is to be generated, based on whether the position of the user's fingertip performing the manipulation input is located inside the predetermined area in which the vibration is to be generated.

Here, a position of a GUI manipulation part to be displayed on the display panel 160, of an area for displaying an image, of an area representing an entire page, or the like on the display panel 160 is specified by area data that represents the area. The area data is provided, in all applications, with respect to all GUI manipulation parts to be displayed on the display panel 160, the area for displaying an image, or the area representing the entire page.

Accordingly, when the drive controlling apparatus 300 determines, as the second predetermined condition, whether the position of the user's fingertip performing the manipulation input is within the predetermined area in which a vibration is to be generated, a type of the application(s) activated by the electronic device 100 is of concern to the determination. This is because contents displayed on the display panel 160 differ depending on the types of the applications.

Further, this is because types of the manipulation inputs of moving the user's fingertip(s) touching the surface of the top panel 120 differ depending on the types of the applications. For example, there is a flick operation as a type of a manipulation input performed by moving the user's fingertip(s) touching the surface of the top panel 120 when manipulating a GUI manipulation part. The flick operation is an operation performed by moving the user's fingertip for a relatively short distance to flick (snap) the surface of the top panel 120.

In a case where the user turns over a page, a swipe operation is performed, for example. The swipe operation is an operation performed by moving the user's fingertip for a relatively long distance to swipe the surface of the top panel 120. The swipe operation is performed when the user flips a page or a photo, for example. Further, in a case of sliding the slider of the GUI manipulation part (see the slider 102B in FIG. 1), a drag operation is performed to drag the slider.

The manipulation inputs that are performed by moving the user's fingertip(s) touching the surface of the top panel 120, such as the flick operation, the swipe operation and the drag operation that are introduced as examples, are used differently depending on types of displayed contents by the applications. Accordingly, the type of the application executed by the electronic device 100 is related to determining whether the position of the user's fingertip performing the manipulation input is within the predetermined area in which a vibration is to be generated.

The drive controlling part 240 uses the area data to determine whether the position represented by the position data input from the driver IC 151 is within the predetermined area in which a vibration is to be generated.

The memory 250 stores data that associates data, which represents the types of the applications, with area data, which represents the areas of the GUI input parts or the like in which a manipulation input is to be performed, and with pattern data, which represents vibration patterns.

The drive controlling part 240 performs the following processes in order to interpolate a positional change of the position of the user's fingertip during the required duration of time from a point of time when the position data is input to the drive controlling apparatus 300 from the driver IC 151 to a point of time when the driving signal is calculated based on the position data.

The drive controlling apparatus 300 performs calculation for each predetermined control cycle. Similarly, the drive controlling part 240 also performs calculation for each predetermined control cycle. Hence, when the required duration of time, from the point of time when position data is input from the driver IC 151 to the drive controlling apparatus 300 to the point of time when the driving signal is calculated by the drive controlling part 240 based on the position data, is $\Delta t$, the required duration $\Delta t$ of time is equal to the control cycle.

Here, the moving speed of the user's fingertip can be calculated as a velocity of a vector that has a starting point (x1, y1) represented by the position data input to the drive controlling apparatus 300 from the driver IC 151 and a terminal point (x2, y2) corresponding to the position of the user's fingertip after an elapse of the required duration $\Delta t$ of time.

The drive controlling part 240 estimates coordinates (x3, y3) after the elapse of the required duration $\Delta t$ of time by calculating a vector having a starting point (x2, y2) represented by the position data input to the drive controlling apparatus 300 from the driver IC 151 and a terminal point (x3, y3) corresponding to the position of the user's fingertip after the elapse of the required duration $\Delta t$ of time.

The electronic device 100 of the embodiment interpolates the positional change of the position of the user's fingertip having arisen in the required duration $\Delta t$ of time by estimating coordinates after the elapse of the required duration $\Delta t$ of time as described above.

The drive controlling part 240 performs such calculation of estimating the coordinates after the elapse of the required duration $\Delta t$ of time. The drive controlling part 240 determines whether the estimated coordinates are located inside the predetermined area in which a vibration is to be generated and generates the vibration when the estimated coordinates are located inside the predetermined area. Accordingly, the second predetermined condition is that the estimated coordinates are located inside the predetermined area in which a vibration is to be generated.

As described above, the two predetermined conditions required for the drive controlling part 240 to output the amplitude data to the amplitude modulator 320 are that the moving speed of the user's fingertip is greater than or equal to the predetermined threshold speed and that the estimated coordinates are located in the predetermined area in which a vibration is to be generated.

In a case where the moving speed of the user's fingertip is greater than or equal to the predetermined threshold speed and the estimated coordinates are located inside the predetermined area in which the vibration is to be generated, the drive controlling part 240 reads amplitude data that represents an amplitude value corresponding to the moving speed from the memory to output the amplitude data to the amplitude modulator 320.

The memory 250 stores data that associates data, which represents the types of the applications, with area data, which represents the areas of the GUI input parts or the like in which a manipulation input is to be performed, and with pattern data, which represents vibration patterns.

Further, the memory 250 stores programs and data necessary for the application processor 220 to execute the applications, and stores programs and data necessary for communicating processes of the communication processor 230, and the like.

The sinusoidal wave generator 310 generates sinusoidal waves required for generating the driving signal that is for vibrating the top panel 120 at the natural vibration frequency. For example, in a case of causing the top panel 120 to vibrate at the natural vibration frequency f of 33.5 kHz, a frequency of the sinusoidal waves is 33.5 kHz. The sinusoidal wave generator 310 inputs a sinusoidal wave signal in the ultrasound frequency band to the amplitude modulator 320.

The sinusoidal wave signal generated by the sinusoidal wave generator 310 is an AC reference signal based on which a driving signal is generated to generate the natural vibration in the ultrasound frequency band, and has a constant frequency and a constant phase. The sinusoidal wave generator 310 inputs the sinusoidal wave signal in the ultrasound frequency band to the amplitude modulator 320.

Note that although the sinusoidal wave generator 310 that generates a sinusoidal wave signal is used in the embodiment described here, a signal other than a sinusoidal wave signal may be used. For example, a signal having a waveform obtained by damping the rising and the falling of a waveform of a clock signal may be used. Therefore, a signal generator that generates an AC signal in the ultrasonic band may be used in place of the sinusoidal wave generator 310.

Using the amplitude data input from the drive controlling part 240, the amplitude modulator 320 modulates an amplitude of the sinusoidal wave signal, input from the sinusoidal wave generator 310, to generate a driving signal. The amplitude modulator 320 modulates only the amplitude of the sinusoidal wave signal in the ultrasound frequency band, input from the sinusoidal wave generator 310, to generate the driving signal without modulating a frequency and a phase of the sinusoidal wave signal.

Hence, the driving signal output from the amplitude modulator 320 is a sinusoidal wave signal in the ultrasound frequency band obtained by modulating only the amplitude of the sinusoidal wave signal in the ultrasound frequency band input from the sinusoidal wave generator 310. It should be noted that in a case where the amplitude data is zero, the amplitude of the driving signal is zero. This is the same as the amplitude modulator 320 not outputting the driving signal.

Next, the data stored in the memory 250 will be described with reference to FIG. 8.

FIG. 8 is a diagram illustrating the data stored in the memory 250.

As illustrated in FIG. 8, the data stored in the memory 250 associates data representing types of applications with area data representing coordinate values of areas where a GUI manipulation part or the like on which a manipulation input is performed is displayed, and with pattern data representing vibration patterns.

An application Identification (ID) is illustrated as the data representing the type of the application. Further, formulas f1 to f4, representing coordinate values of areas where a GUI manipulation part or the like on which a manipulation input is performed is displayed, are illustrated as the area data. Further, P1 to P4 are illustrated as the pattern data representing the vibration patterns. The pattern data P1 to P4 are data in which amplitude data representing amplitude values are arranged in time series.

The applications represented by application IDs include all applications usable in a device such as a smartphone terminal device or a tablet computer, and include a mode for editing an e-mail.

Next, a process that is executed by the drive controlling part 240 of the drive controlling apparatus 300 of the electronic device 100 according to the embodiment will be described with reference to FIG. 9.

Figure 9:
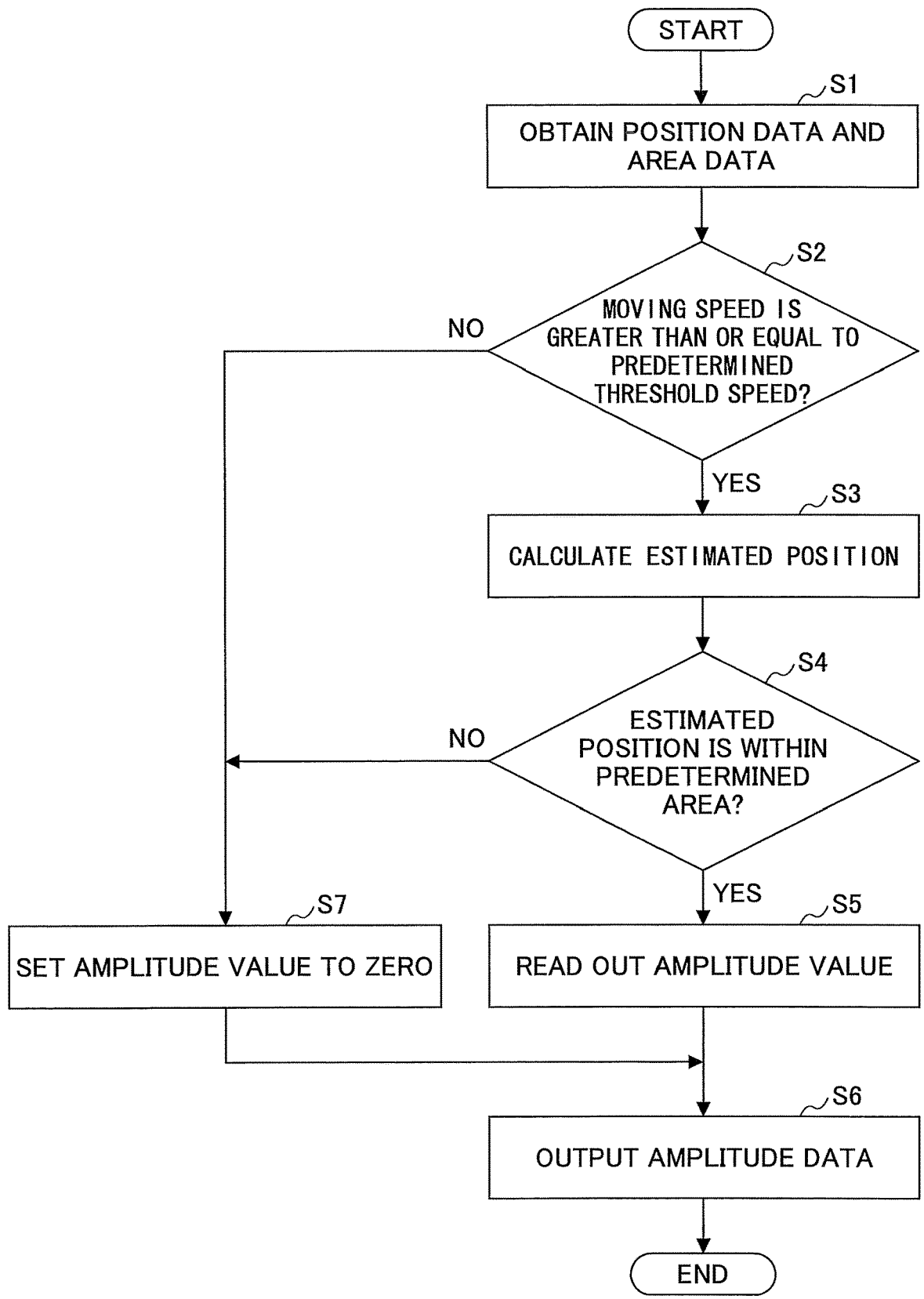
FIG. 9 is a flowchart illustrating the process that is executed by the drive controlling part of the drive controlling apparatus of the electronic device according to the embodiment.

FIG. 9 is a flowchart illustrating the process that is executed by the drive controlling part 240 of the drive controlling apparatus 300 of the electronic device 100 according to the embodiment.

An operating system (OS) of the electronic device 100 executes control for driving the electronic device 100 every predetermined control cycle. Accordingly, the drive controlling apparatus 300 performs calculation for every predetermined control cycle to repeatedly execute the flow illustrated in FIG. 9. The same applies to the drive controlling part 240, and the drive controlling part 240 repeatedly executes the flow illustrated in FIG. 9 for every predetermined control cycle.

Here, when a required duration of time, from a point of time when position data is input from the driver IC 151 to the drive controlling apparatus 300 to a point of time when a driving signal is calculated by the drive controlling apparatus 300 based on the position data, is $\Delta t$, the required duration $\Delta t$ of time is substantially equal to the control cycle.

A duration of time of one cycle of the control cycle can be treated as a duration of time corresponding to the required duration $\Delta t$ of time, which is required from the point of time at which the position data is input to the drive controlling apparatus 300 from the driver IC 151 to the point of time at which the driving signal is calculated based on the input position data.

The drive controlling part 240 starts the process when the electronic device 100 is powered on.

With respect to a GUI manipulation part on which a manipulation input is currently being performed, the drive controlling part 240 obtains area data, associated with a vibration pattern, in step S1 in accordance with coordinates represented by the current position data and with a type of a current application. The area data is associated with a vibration pattern.

The drive controlling part 240 determines whether the moving speed is greater than or equal to the predetermined threshold speed in step S2. The moving speed may be calculated by a vector operation. Note that the threshold speed may be set as the minimum speed of the moving speed of the user's fingertip performing the manipulation input while moving the user's fingertip such as a flick operation, a swipe operation, a drag operation or the like. Such a minimum speed may be set based on an experimental result, a resolution of the touch panel 150 or the like.

In a case where the drive controlling part 240 has determined that the moving speed is greater than or equal to the predetermined threshold (YES in step S2), the drive controlling part 240 calculates in step S3 estimated coordinates of after the elapse of the duration $\Delta t$ of time based on the coordinates represented by the current position data and based on the moving speed.

The drive controlling part 240 determines in step S4 whether the estimated coordinates after the elapse of the duration $\Delta t$ of time are located within an area St which is represented by the area data obtained in step S1.

In a case where the drive controlling part 240 determines that the estimated coordinates after the elapse of the duration $\Delta t$ of time are within the area St represented by the area data obtained in step S1, the drive controlling part 240 obtains in step S5, from the pattern data, amplitude data representing an amplitude value corresponding to the moving speed obtained in step S2.

The drive controlling part 240 outputs the amplitude data in step S6. As a result, the amplitude modulator 320 generates a driving signal by modulating the amplitude of the sinusoidal wave output from the sinusoidal wave generator 310, and the vibrating element 140 is driven by the driving signal.

Conversely, in a case where drive controlling part 240 has determined that the moving speed is less than the predetermined threshold speed (NO in step S2) or in a case where the drive controlling part 240 has determined that the estimated coordinates after the elapse of the duration $\Delta t$ of time are not within the area St (NO in step S4), the drive controlling part 240 sets the amplitude value to be zero in step S7.

As a result, the drive controlling part 240 outputs amplitude data of which the amplitude value is zero, and the amplitude modulator 320 generates a driving signal by modulating the amplitude of the sinusoidal wave output from the sinusoidal wave generator 310 to be zero. Accordingly, in this case, the vibrating element 140 is not driven.

Next, an example of an operation of the electronic device 100 according to the embodiment will be described with reference to FIGS. 10 and 11.

Figure 10:
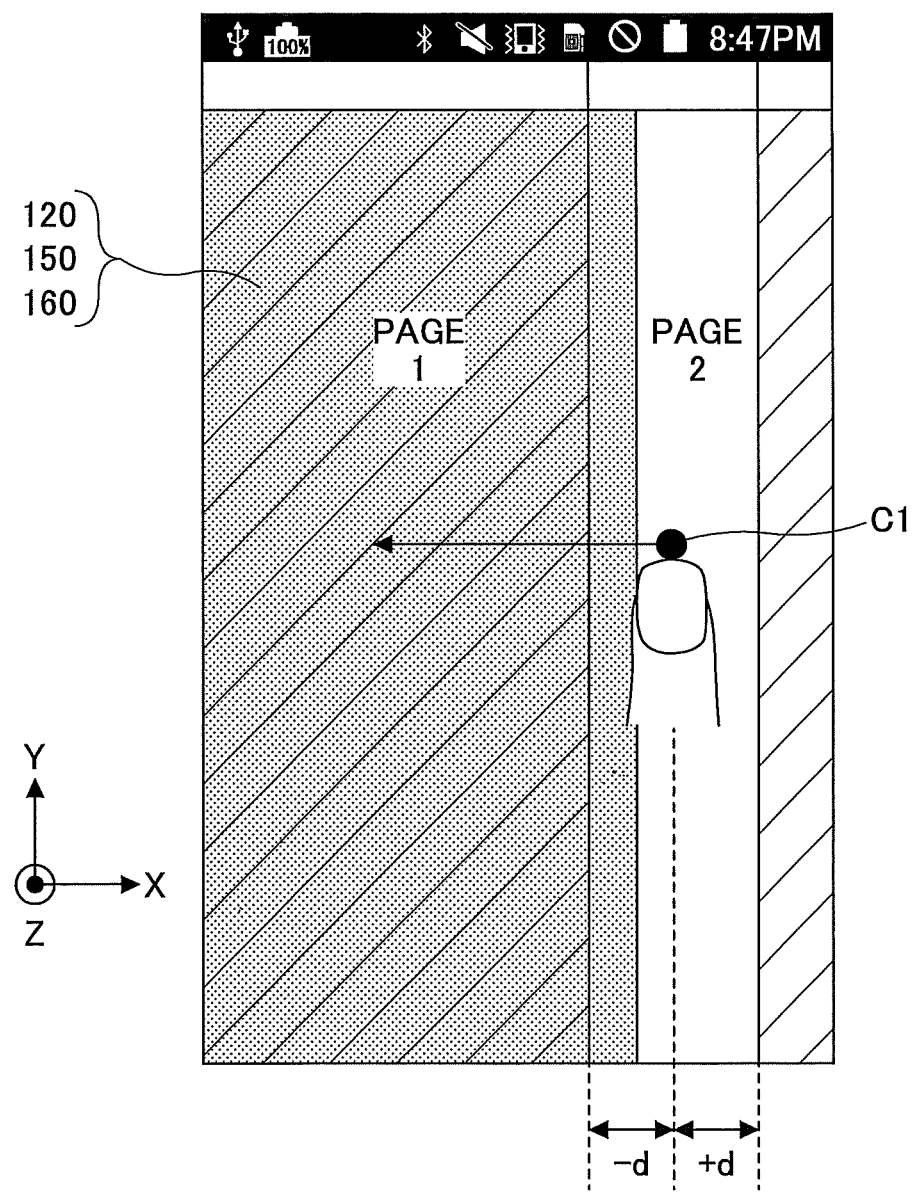
FIG. 10 is a diagram illustrating an example of an operation of the electronic device according to the embodiment.
Figure 11:
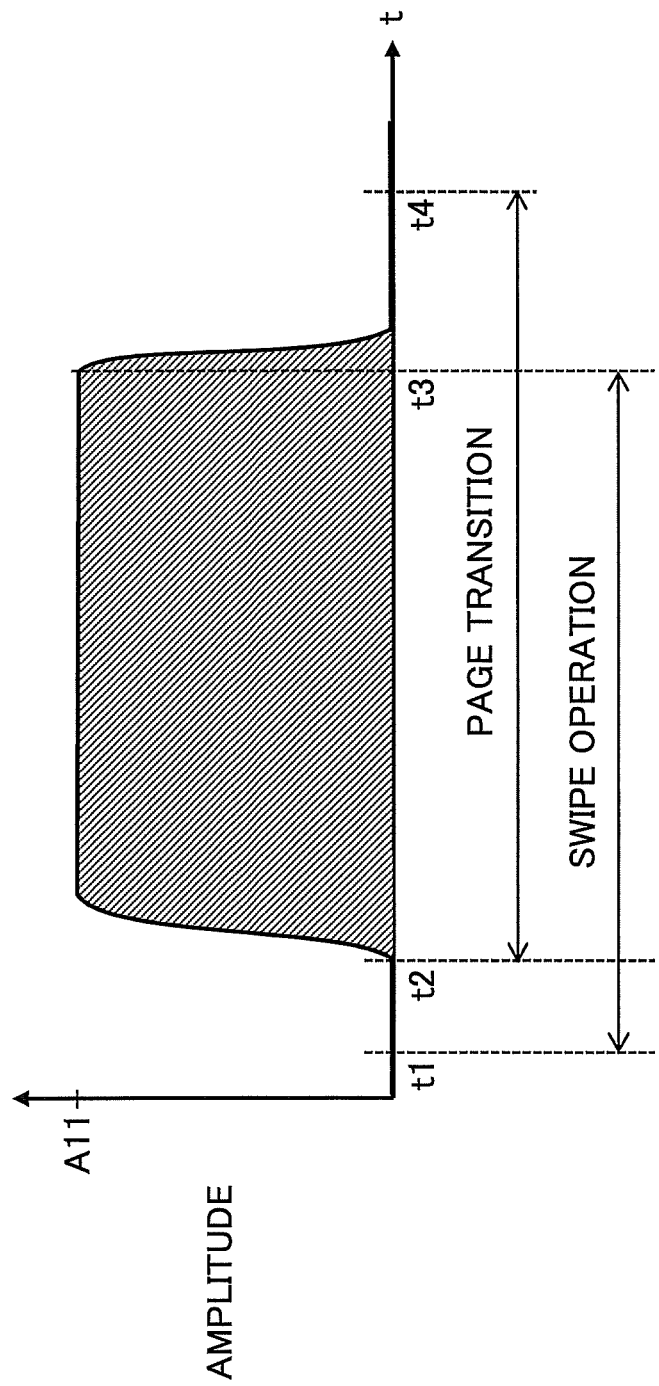
FIG. 11 is a diagram illustrating an example of an operation of the electronic device according to the embodiment.

FIGS. 10 and 11 are diagrams illustrating an example of the operation of the electronic device 100 according to the embodiment. In FIGS. 10 and 11, a XYZ coordinate system similar to that in FIG. 2 to FIG. 4 is defined.

FIG. 10 is a diagram illustrating the top panel 120, the touch panel 150 and the display panel 160 in plan view, where the user of the electronic device 100 touches a page 1 indicated in grey with his or her fingertip and is about to open a page 2 indicated in white by performing a swipe operation leftward. That is, the page displayed on the electronic device 100 is about to transition from the page 1 to the page 2.

In an operation mode in which a page is flipped, the drive controlling part 240 determines whether the manipulation input is a swipe operation. For example, upon the user's fingertip moving by ±d mm or more in the X axis direction from a starting position at which the user touches the top panel 120 first with the user's fingertip, the drive controlling part 240 determines that a swipe operation is being performed, and generates a vibration at the top panel 120 when the user's fingertip enters into areas indicated by oblique lines. The areas indicated by oblique lines are the area St.

Here, in a case where a manipulation input is performed as illustrated in FIG. 10, a vibration generated at the top panel 120 will be described with reference to FIG. 11. The vibration is generated by a driving signal output from the amplitude modulator 320 based on amplitude data output from the drive controlling part 240. In FIG. 11, the horizontal axis represents time, and the vertical axis represents the amplitude value of the amplitude data. Here, it is assumed that the moving speed of the user's fingertip is approximately constant when the user performs the swipe operation.

The user touches the top panel 120 at the position C1 with his or her fingertip and begins to move his or her fingertip along the surface of the top panel 120 leftward at the time point t1. At the time point t2 when the user has moved his or her fingertip by d mm from the position C1, the drive controlling part 240 determines that the manipulation input of the user is a swipe operation and performs driving with the vibration pattern for the swipe operation. An operating distance d mm, which is used for determining the swipe operation, corresponds to a length of the move of the user's fingertip during a period of time between the time point t1 and the time point t2. At the time point t2, the page transition is started.

The amplitude of the vibration pattern for the swipe operation is A11, and is a driving pattern in which the vibration continues while the swipe operation is being performed.

Upon the user releasing his or her fingertip from the top panel 120 and completing the swipe operation at the time point t3, the drive controlling part 240 sets the amplitude value to be zero. Accordingly, the amplitude is set to be zero immediately after the time point t3. Further, at the time point t4 after the time point t3, the page transition is completed.

As described above, in a case where the user performs a swipe operation in order to flip a page, the drive controlling part 240 outputs the amplitude data having a constant amplitude value (A11), for example. Therefore, the kinetic friction force applied to the user's fingertip is reduced while the user is performing the swipe operation. As a result, it is possible to provide the slippery or smooth touch (texture) to the user. Accordingly, the user can recognize that the swipe operation is being accepted by the electronic device 100 through the user's fingertip.

Note that the vibration pattern when a user performs a swipe operation to flip a page is described with reference to FIG. 10 and FIG. 11. However, even when a flick operation or an operation for moving the user's fingertip along the surface of the top panel 120 is performed, it is possible to provide various tactile sensations to the user by driving the vibrating element 140.

More specifically, when the position of a manipulation input moves across the boundary of a GUI manipulation part such as the button 102A (see FIG. 1) displayed on the display panel 160, or moves while manipulating the GUI manipulation part, the intensity of the natural vibration may be changed. Also, when the position of a manipulation input moves within the area of the GUI manipulation part of the slider 102B (see FIG. 1) displayed on the display panel 160, the intensity of the natural vibration may be changed in accordance with an amount of the manipulation of the slider 102B or when reaching a scale mark of the slider 102.

Here, the position of the vibrating element 140 at the top panel 120 and a displacement and a curvature of the top panel 120 will be described. Here, when the top panel 120 vibrates, the end parts of the top panel 120 are assumed to be free ends.

Figure 12:
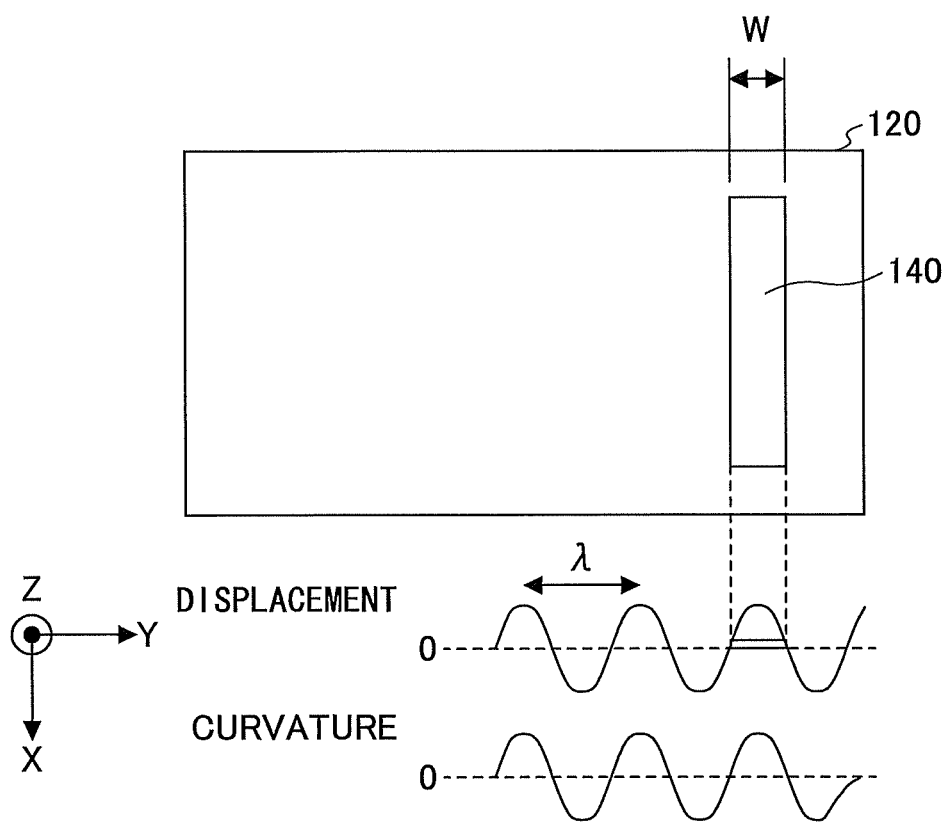
FIG. 12 is a diagram illustrating a position of the vibrating element at the top panel and a displacement and a curvature of the top panel.
Figure 13:
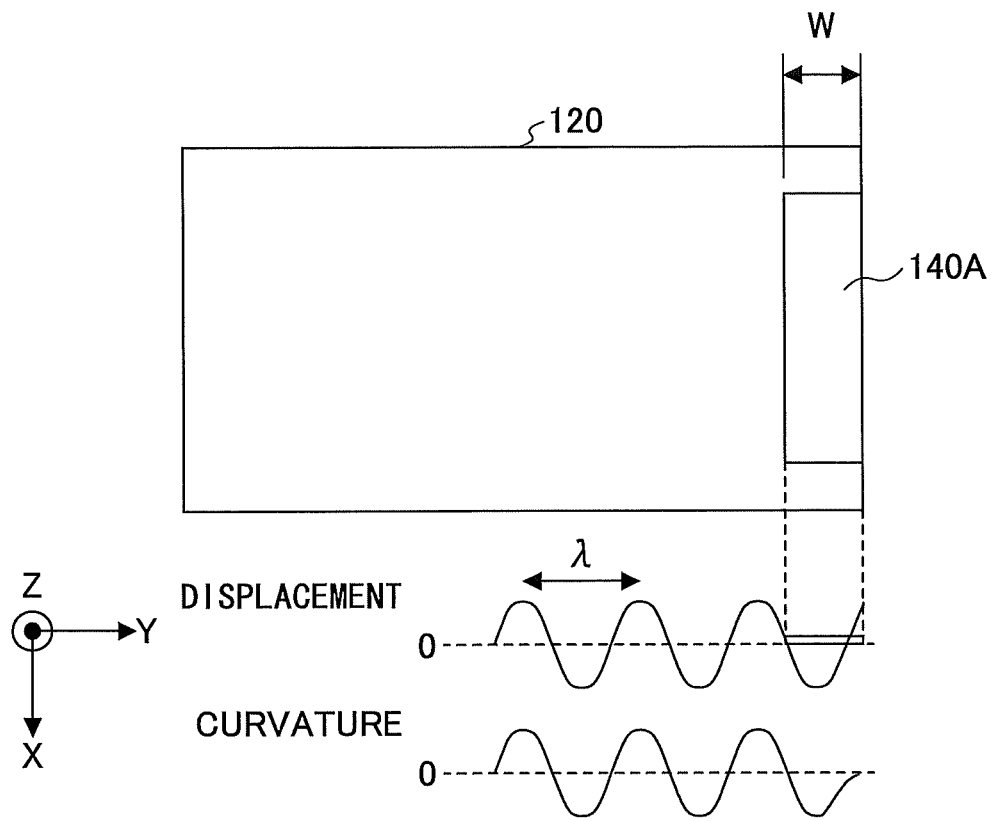
FIG. 13 is a diagram illustrating a position of the vibrating element at the top panel and a displacement and a curvature of the top panel.

FIG. 12 and FIG. 13 are diagrams illustrating the position of the vibrating element 140 at the top panel 120 and a displacement and a curvature of the top panel 120. In FIG. 12, the level of the displacement and the curvature are exaggerated such that the displacement and the curvature of the top panel 120 are easily understood.

Note that in FIG. 12 and FIG. 13, the points where the displacement is 0 indicate nodes of the natural vibration, and the points where the displacement is the maximum indicate antinodes of the natural vibration. Further, the curvature is a physical quantity obtained by differentiating the displacement twice. When the displacement is represented by a sinusoidal wave (a sine wave), the curvature is at the opposite phase because of being represented by −sin. Here, for the convenience of description, the displacement and the curvature are illustrated in the same phase.

In FIG. 12, the vibrating element 140 is disposed at the position of the second antinode from the positive side end part of the top panel 120 in the Y axis direction (position between the second node and the third node from the end part). The width of the vibrating element 140 in the Y axis direction is half (0.5λ) of the wavelength λ of a sinusoidal wave (a sine wave) representing the displacement of the top panel 120. The wavelength λ is a wavelength of a sinusoidal wave representing a displacement occurring at the top panel 120, and is a value obtained without considering the vibrating element 140.

The width of the vibrating element 140 in the Y axis direction is set to be 0.5λ so as to locate the vibrating element 140 between the second node and the third node in the Y axis direction, from the positive side end part of the top panel 120 in the Y axis direction. This is because it is considered that vibration can efficiently be generated at the top panel 120 by locating the vibrating element 140 of 0.5λ between a node and a node as described above.

In FIG. 12, because the positive side end part of the top panel 120 in the Y axis direction is a free end, the displacement is maximized. Conversely, at the positive side end part of the top panel 120 in the Y axis direction, the curvature is 0 because it is a free end. Hence, at the positive side end part of the top panel 120 in the Y axis direction, both the shape and the curvature indicate values deviated from values given by a trigonometric function. Note that the shape represented by the distribution of the displacement in the Y axis direction illustrated in FIG. 12 is referred to as the shape of the displacement.

The vibration of the top panel 120 is theoretically a bending vibration of a beam, and a general solution of a standing wave of the bending vibration of the beam is expressed by the following formula (3). The formula (3) is described in "Theory of Mechanical Vibrations, $2^{nd}$ Ed., Toshihiro Irie", for example.

$$U(Y) = D_1 \cosh\frac{aY}{L} + D_2 \sinh\frac{aY}{L} + D_3 \cos\frac{aY}{L} + D_4 \sin\frac{aY}{L} \quad (3)$$

Here, L is the length of the top panel 120 and can be treated as the length of the beam. The range of Y is from 0 to L.

When an eigenvalue corresponding to 10 periods is calculated as an example under conditions that both ends are free ends, $a \approx 9.75 \times 2\pi \times L$. That is, it is actually 9.75 periods with respect to the length L of the top panel 120. The wavelength $\lambda = L/9.75$.

When solving for the respective coefficients $D_1$, $D_2$, $D_3$, and $D_4$, a vibration shape expressed by the following formula (4) can be approximated.

$$U(Y) \approx \cosh\frac{aY}{L} - \sinh\frac{aY}{L} + \cos\frac{aY}{L} - \sin\frac{aY}{L} \quad (4)$$

Using the formula (4), the distance from the end to the second node is obtained as approximately 0.623×wavelength $\lambda$. Although it varies slightly depending on the number of periods etc., the distance to the second node point can be approximated by $5/8 \times \lambda = 0.625\lambda$.

In FIG. 13, the vibrating element 140A is disposed at the positive side end part of the top panel 120 in the Y axis direction. Although the vibrating element 140A is basically similar to the vibrating element 140 illustrated in FIG. 12, the width of the vibrating element 140A in the Y axis direction is different from that of that of the vibrating element 140. Thus, here, it is described as the vibrating element 140A for distinction. The vibrating element 140A is a vibrating element disposed at the positive side end part in the Y axis direction.

Because the vibrating element 140A is arranged between the positive side end part of the top panel 120 in the Y axis direction and the second node from the positive side end part of the top panel 120 in the Y axis direction, the width of the vibrating element 140A in the Y axis direction is $0.625\lambda$.

The width of the vibrating element 140A in the Y axis direction is set to be $0.625\lambda$ so as to locate, in the Y axis direction, the vibrating element 140A between the positive side end part of the top panel 120 in the Y axis direction and the second node, from the positive side end part of the top panel 120 in the Y axis direction. Because outward from the second node is considered to be in a state specific to the end, the width of the vibrating element 140A in the Y axis direction is set to be $0.625\lambda$.

As described above, the distance from the end to the second node is approximately $0.625\lambda$. Also, from second order differentiation of the above U(x), the curvature is 0 at the panel end and at the second node from the panel end, and the curvature is of the same sign between them. It is considered that vibration can be efficiently generated at the top panel 120 by locating the vibrating element 140, whose width is $0.625\lambda$, between the positive side end part of the top panel 120 in the Y axis direction and the second node, from the positive side end part of the top panel 120 in the Y axis direction.

Figure 14:
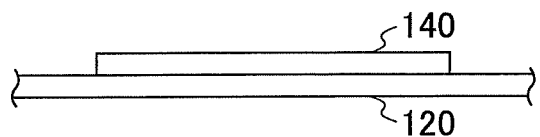
FIG. 14 is a diagram that describes a state in which the top panel and the vibrating element bend.
Figure 15:
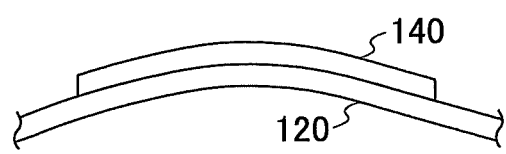
FIG. 15 is a diagram that describes a state in which the top panel and the vibrating element bend.

FIG. 14 and FIG. 15 are diagrams that describe a state in which the top panel 120 and the vibrating element 140 bend.

Upon the vibrating element 140 extending from a state in which the top panel 120 and the vibrating element 140 are not bent as illustrated in FIG. 14, to a state as illustrated in FIG. 15, a difference between the length of the top panel 120 and the length of the vibrating element 140 generates a bending force. Thereby, a vibration occurs at the top panel. Conversely, upon the vibrating element 120 contracting, a bending force occurs towards the opposite side. In order to generate bending and generate a standing wave by deforming the vibrating element as described above, the vibrating element 140 is required to be attached to a portion where the curvature of the standing wave is not zero. If attachment of the vibrating element 140 extends over a portion where the curvature is reversed, at the portion where the curvature is reversed, vibration in the opposite phase is caused, and the effect of causing vibration is canceled out. Thus, it is considered that it is the most efficient to fit the width of the vibrating element 140 to a range of the same sign between the points where the curvature is zero. These are the widths of the vibrating elements illustrated in FIG. 12 and FIG. 13.

Figure 16:
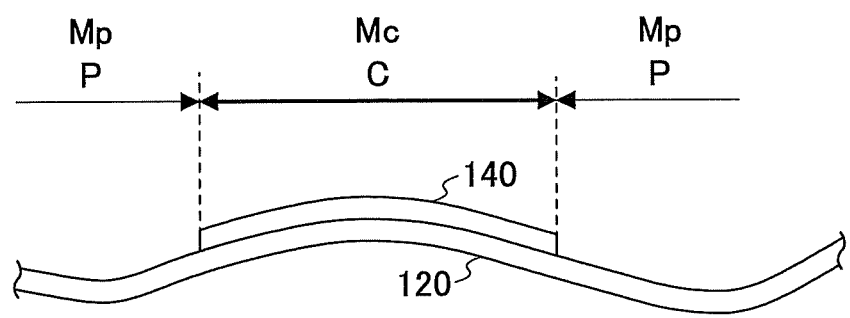
FIG. 16 is a diagram illustrating a state in which the top panel and the vibrating element are bent.

FIG. 16 is a diagram illustrating a state in which the top panel 120 and the vibrating element 140 are bent.

Within the top panel 120, the flexural rigidity of the sections P to which the vibrating element 140 is not attached differs from the flexural rigidity of the section C to which the vibrating element 140 is attached. That is, the flexural rigidity of the top panel 120 and the vibrating element 140 at the section C, where the top panel 120 and the vibrating element 140 are superimposed and fixed, is different from the flexural rigidity of the top panel 120 at the sections P of the top panel 120 alone.

The sections where the vibrating element 140 is not attached are sections of the top panel 120 only and are sections where the top panel 120 is present alone.

Here, the flexural rigidity of the top panel 120 and the vibrating element 140 at the section C, where the top panel 120 and the vibrating element 140 are superimposed and fixed is referred to as Mc, and the flexural rigidity of the top panel 120 at the sections P of the top panel 120 alone is referred to as Mp. The flexural rigidity Mc is larger than the flexural rigidity Mp. Note that for the sections P of the top panel 120 alone, only sections adjacent to the section C are illustrated.

In this case, it is found that it is effective to set the width of the vibrating element 140 in the Y axis direction in consideration of the ratio $\alpha$ (rigidity ratio) between the flexural rigidity Mc and the flexural rigidity Mp (=Mp/Mc), in order to generate the natural vibration in the ultrasound frequency band at the top panel 120 of the electronic device 100 to provide a favorable tactile sensation.

Here, the width of the vibrating element 140 in the Y axis direction is the width of the vibrating element 140 in a direction in which the displacement of the natural vibration in the ultrasound frequency band varies. In the present embodiment, because the displacement of the natural vibration in the ultrasound frequency band varies in the Y axis direction, the width of the vibrating element 140 in the Y axis direction is described.

Note that in the following description, the width of the vibrating element 140 in the Y axis direction is referred to as W. Further, in a state in which the vibrating element 140 is attached to the top panel 120, the wavelength of a sinusoidal wave representing the displacement occurring at the top panel 120 is referred to as $\lambda c$. This is different from the above described wavelength $\lambda$. The above described wavelength $\lambda$ is the wavelength of a sinusoidal wave representing the displacement occurring at the top panel 120 and is a value obtained without considering the vibrating element 140.

Figure 17:
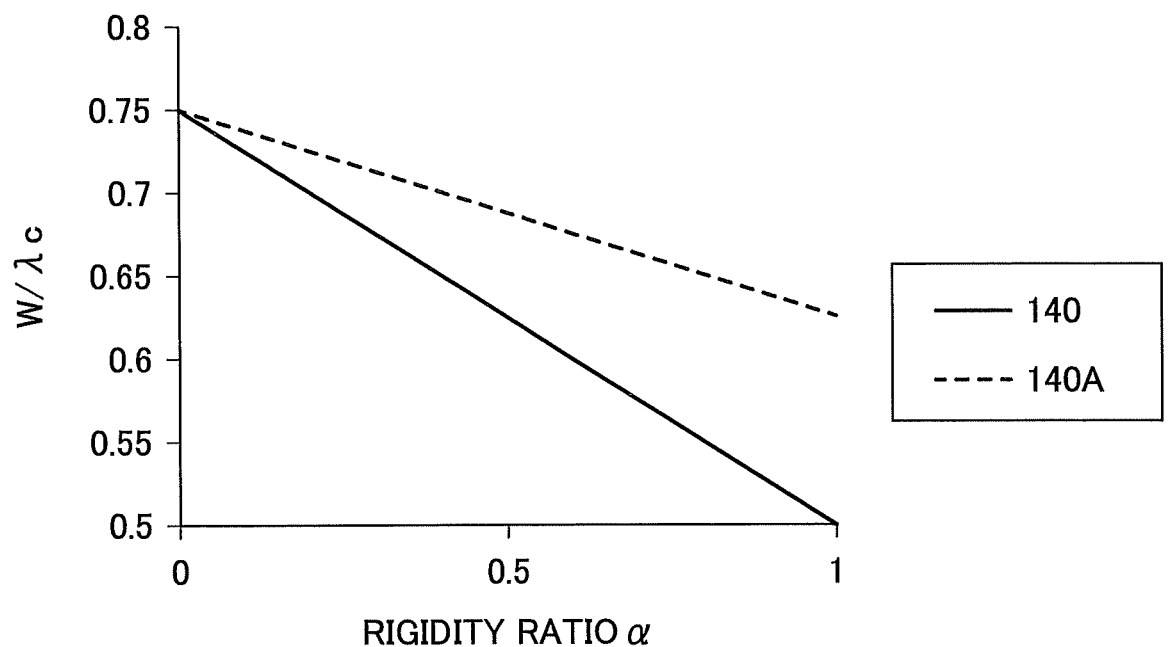
FIG. 17 is a diagram illustrating a relationship between a width/wavelength of the vibrating element and a rigidity ratio.

FIG. 17 is a diagram illustrating a relationship between an optimum element width $W/\lambda c$ and the rigidity ratio $\alpha$. Here, W/λc is the ratio of the width W of the vibrating element 140 in the Y axis direction to the wavelength λc.

In FIG. 17, the property indicated by the solid line indicates a property of the optimum element width W/λc with respect to the rigidity ratio α in a case where the vibrating element 140 is disposed, as illustrated in FIG. 12, at a position of the second antinode from the positive side end part of the top panel 120 in the Y axis direction.

In addition, the property indicated by the broken line indicates a property of the optimum element width W/λc with respect to the rigidity ratio α in a case where the vibrating element 140A is disposed, as illustrated in FIG. 13, at the positive side end part of the top panel 120 in the Y axis direction.

When the rigidity ratio α is very small, the ratio obtained by dividing the optimum value of the width of the vibrating element 140 in the Y axis direction by the wavelength λc is approximately 0.75. Here, the vibrating element 140 made of ceramic or the like has higher Young's modulus than that of the top panel 120 made of glass or the like. Therefore, assuming an extreme case, the rigidity ratio α is set to be 0 when the flexural rigidity Mc is extremely larger than the flexural rigidity Mp and, W/λc is set to be 0.75 when the rigidity ratio α is 0.

Note that this is considered to be equally applied to the case where the vibrating element 140 is disposed at the position of the second antinode from the positive side end part of the top panel 120 in the Y axis direction and to the case where the vibrating element 140A is disposed at the positive side end part of the top panel 120 in the Y axis direction.

Further, ignoring the effect of the vibrating element and without considering the rigidity ratio α, when the vibrating element 140 is disposed, as illustrated in FIG. 12, at the position of the second antinode from the positive side end part of the top panel 120 in the Y axis direction, the width W of the vibrating element 140 in the Y axis direction is 0.5λ.

Because a case where the rigidity ratio α is 1 is a state in which the flexural rigidity is not changed by the effect of the vibrating element even at the portion to which the vibrating element is attached, this case can be considered as matching the case illustrated in FIG. 12 in which the top panel is considered alone. In addition, because the flexural rigidity is not changed by the effect of the vibrating element, λ=λc. Hence, when the rigidity ratio α is 1 and the vibrating element 140 is disposed at the position of the second antinode from the positive side end part of the top panel 120 in the Y axis direction, W/λc is set to be 0.5.

Also, similarly, when the vibrating element 140A is disposed at the positive side end part of the top panel 120 in the Y axis direction as illustrated in FIG. 13, the case where the rigidity ratio α is 1 is considered to match the case of considering the top panel alone in the arrangement of FIG. 13. When ignoring the vibrating element 140 as illustrated in FIG. 13, the optimum width of the vibrating element 140A in the Y axis direction is 0.625λ. When the rigidity ratio α is 1, the same element width is optimum, and because λ=λc, W/λc is approximately 0.625.

Hence, when the rigidity ratio α is 1 and the vibrating element 140A is disposed at the positive side end part of the top panel 120 in the Y axis direction, W/λc is set to be 0.625.

The property indicated by the solid line illustrated in FIG. 17 is expressed by the following formula (5), and the property indicated by the broken line illustrated in FIG. 17 is expressed by the following formula (6).

$$W=(0.75-0.25\times\alpha)\times\lambda c \quad (5)$$

$$W=(0.75-0.125\times\alpha)\times\lambda c \quad (6)$$

Note that to a case where the vibrating element 140 is attached to an antinode closer to the center of the top panel than is the antinode to which the vibrating element 140 is attached as illustrated in FIG. 12, the property of the formula (5) is applied under conditions the same as those in the case of the antinode in FIG. 12. In a case where the end part of the top panel 120 is a fixed end, although the endmost antinode has a unique vibration shape due to the fixation, the vibration shape at other antinodes is approximately in a trigonometric function, and is equal to that of the case illustrated in FIG. 12 where the vibrating element 140 is arranged at the position of the second antinode from the positive side end part of the top panel 120 in the Y axis direction. Therefore, to a case where the end part of the top panel 120 is a fixed end, the property of the formula (5) is applied. In a case where the end is a rotatable supported end of the displacement 0, the vibration shape is in a trigonometric function, and the property of the formula (5) is applied to all antinodes including the endmost antinode.

In the following, in FIG. 17, the reason why W/λc is optimum at 0.75 when the rigidity ratio α is 0 will be described.

In short, the case in which the rigidity ratio α is 0 is a case in which the flexural rigidity Mp is very small with respect to the flexural rigidity Mc. In the case where the rigidity ratio α is 0, even when the top panel 120 is vibrated in a mode of the natural vibration of the entire top panel 120, the displacement of the section where the vibrating element 140 is overlapped with and attached to the top panel 120 is considered to be equal to a vibration in a case where both ends of the section where the vibrating element 140 is overlapped with and attached to the top panel 120 are free ends. This is because the flexural rigidity Mp of the top panel 120 alone is extremely smaller than the flexural rigidity Mc.

Figure 18:
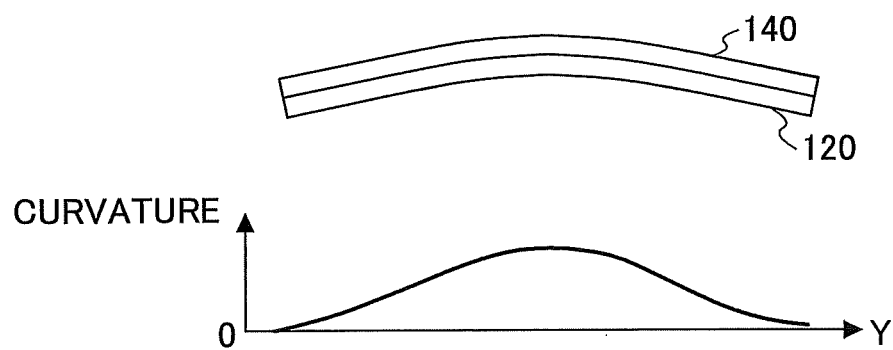
FIG. 18 is a diagram illustrating a primary resonance mode of a beam having free ends at both ends.

FIG. 18 is a diagram illustrating a primary resonance mode of a beam having free ends at both ends. The beam having free ends at both ends is a model of the section where the vibrating element 140 is overlapped with and attached to the top panel 120. In FIG. 18, the width of the beam is indicated by the horizontal direction. The upper part of FIG. 18 indicates the displacement of the model of the section where the top panel 120 is overlapped with and attached to the vibrating element 140 (the shape represented by the distribution of the displacement in the Y axis direction), and the lower part of FIG. 18 indicates the distribution of the curvature of the model. The curvature can be obtained by differentiating the displacement twice. Note that the displacement of the model (the shape represented by the distribution of the displacement in the Y axis direction) indicates the shape of the vibration in the Y axis direction.

According to the theory of bending vibration of a beam, in a case where both ends are free ends, primary resonance is obtained at the time when the width of the beam (usually, a length of a direction in which the vibration propagates) is 0.75 λc. This is determined depending also on a boundary condition and does not change even when the top panel 120 is alone or the vibrating element 140 is overlapped with and attached to the top panel 120 in a stacking structure.

According to the present embodiment, the width W of the vibrating element 140, in a case where the rigidity Mc of the section where the vibrating element 140 is overlapped with and attached to the top panel 120 is large, is fitted to the condition of primary resonance in a case where both ends of the section where the vibrating element 140 is overlapped with and attached to the top panel 120 are free ends.

Here, although λc is determined depending on a frequency and the like of the natural vibration, and is similar in a case of a beam with one layer and a case of a beam with two layers, the formula for the case of two layers is indicated by the following formula (7). In the formula (7), the flexural rigidity Mc is a flexural rigidity of a beam with two layers, $\rho_1$ and $\rho_2$ are respective densities of the two layers of the beam, and $t_1$ and $t_2$ are respective thicknesses of the two layers of the beam.

$$\lambda c = (2\pi/f)^{1/2} \{Mc/(\rho_1 t_1 + \rho_2 t_2)\}^{1/4} \quad (7)$$

For the electronic device 100, a target of a frequency of the natural vibration in the ultrasound frequency band to be generated at the top panel 120 is determined in advance, and a mode of the natural vibration obtained by a frequency close to the targeted frequency is used. Thus, the targeted frequency is determined. Here, when the vibrating element 140 is driven at the targeted frequency, how to set a value of the width W of the vibrating element 140 is discussed.

In a case where the width W is 0.75 λc, when the shape of a vibration obtained at the section where the vibrating element 140 is overlapped with and attached to the top panel 120 (the shape represented by the distribution in the Y axis direction of the displacement) is regarded as the same as the shape of a vibration in primary resonance at free ends of the beam illustrated in FIG. 18, from the boundary condition of free ends, the curvature at both ends of the section, where the vibrating element 140 is overlapped with and attached to the top panel 120, is 0.

Between both ends of the vibrating element 140 in the Y axis direction, the curvature is of the same sign. The sign of the curvature represents whether the curvature illustrated in the lower part of FIG. 18 is above (the positive side) or below (the negative side) 0 in the vertical axis direction. The curvature being of the same sign means the distribution of the curvature being either in the positive side or in the negative side with respect to the Y axis direction.

Because the curvature is of the same sign between both ends of the section, where the vibrating element 140 is overlapped with and attached to the top panel 120 as illustrated in the upper part of FIG. 18, it is suitable for bending the top panel 120 by expansion and contraction of the vibrating element 140.

When the width W of the vibrating element 140 is larger than 0.75 λc, the shape of vibration extends outwardly as compared with a case where primary resonance illustrated in FIG. 18 occurs, and the extended portion becomes a shape in which the curvature is reversed. That is, because an effect of canceling the bending vibration is generated, the efficiency is decreased.

When the width W of the vibrating element 140 is smaller than 0.75 λc, the vibration shape becomes such a shape that the width of the primary resonance narrows and the amplitude at the end portions disappears. Therefore, although the curvature is of the same sign, because the width W is small, the force causing vibration is smaller than that of a case in which the width W is 0.75 λc. From these considerations, the optimum width W when the rigidity ratio α (=Mp/Mc) is small is estimated to be 0.75 λc.

The flexural rigidity of a beam with one layer can be calculated by the following formula (8) using the second moment I (=$dt^3/12$).

$$M_P = EI = Edt^3/12 \quad (8)$$

Here, E is the Young's modulus, d is the length of the top panel 120 in the X axis direction, and t is the thickness of the top panel 120.

In the following description, as a value of the length d of the top panel 120 in the X axis direction being 1 (unit length), the top panel 120 has a unit length in the X axis direction.

The way of finding the flexural rigidity of a beam with one layer is as follows. When the Z axis direction is taken as the thickness direction of the beam, and the neutral point is referred to as $Z_0$ and the curvature radius of the deformation of the beam is referred to as r as per Euler Bernoulli beam theory, the strain $\varepsilon=(Z-Z_0)/r$ and the force occurring at an infinitesimal part ΔZ is expressed by the following formula (9).

$$\Delta f = E\varepsilon \Delta Z = E\frac{(Z-Z_0)}{r}\Delta Z \quad (9)$$

The moment ΔM applied to the neutral point $Z_0$ by this force is expressed by the following formula (10).

$$\Delta M = \Delta f(Z-Z_0) = E\frac{(Z-Z_0)^2}{r}\Delta Z \quad (10)$$

By integration as follows, the flexural rigidity Mp is obtained from the following formula (11) as a moment per curvature (1/r). The center in the thickness direction is taken as the origin of Z, and the integration range is from –t/2 to t/2.

$$M_P = \int_{-\frac{t}{2}}^{\frac{t}{2}} E(Z-Z_0)^2 dZ \quad (11)$$

In the beam with one layer, the neutral point $Z_0$ is the center of the beam, and substituting $Z_0=0$, the following formula (12) is obtained.

$$M_P = \int_{-t/2}^{t/2} EZ^2 dZ = \frac{E}{3}[Z^3]_{-t/2}^{t/2} = E\frac{t^3}{12} \quad (12)$$

In this way, the same flexural rigidity result as in the formula (8) is obtained. Note that in the formula (12), the value of the length d of the top panel 120 in the X axis direction is set to be 1 (unit length).

To obtain the flexural rigidity in a case of two layers by the same procedure as above, first, the neutral point position $Z_0$ of the bending is obtained.

Figure 19:
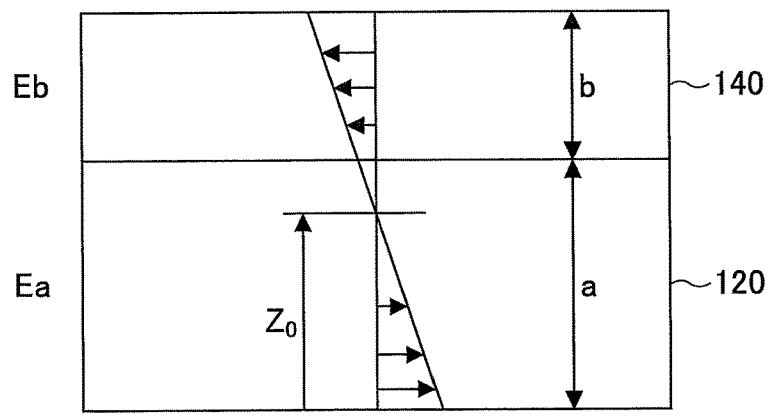
FIG. 19 is a diagram illustrating a section in which the vibrating element is overlapped with and attached to the top panel.

FIG. 19 illustrates a section in which the vibrating element 140 is overlapped with and attached to the top panel 120 as a beam with two layers. The thickness of the first layer (the top panel 120) is referred to as "a" and the Young's modulus of the first layer is referred to as "Ea". The thickness of the second layer (the vibrating element 140) is referred to as "b" and the Young's modulus of the second layer is referred to as "Eb". As illustrated, the origin of Z is the position of the lower surface of the first layer (the top panel 120).

According to the Euler Bernoulli beam theory, when the curvature radius is referred to as r, the strain of the infinitesimal part $\Delta Z$ is $(Z-Z_0)/r$, and the force $\Delta f$ is expressed by the following formula (13) by being multiplied by the Young's modulus Ei of each layer.

$$\Delta f = E_i \varepsilon \Delta Z = E_i \frac{(Z-Z_0)}{r} \Delta Z \qquad (13)$$

Further, F obtained by integrating $\Delta f$ is expressed by the following formula (14).

$$\begin{aligned} F &= \left\{ \int_0^a E_a(Z-Z_0)dZ + \int_a^{a+b} E_b(Z-Z_0)dZ \right\} / r \\ &= \left\{ \frac{E_a}{2}[(Z-Z_0)^2]_0^a + \frac{E_b}{2}[(Z-Z_0)^2]_a^{a+b} \right\} / r \\ &= \left[ \frac{E_a}{2}(a^2 - 2aZ_0) + \frac{E_b}{2}\{(a+b)^2 - a^2 + 2bZ_0\} \right] / r \end{aligned} \qquad (14)$$

Here, in the beam with two layers illustrated in FIG. 19, force can be taken as balanced as a whole. Therefore, when F=0, the neutral point $Z_0$ can be obtained by the following formula (15).

$$Z_0 = \frac{E_a a^2 + E_b((a+b)^2 - a^2)}{2(E_a a + E_b b)} \qquad (15)$$

Also, similarly to the moment of the beam with one layer obtained by using the formula (10), the moment can be obtained by summing the contributions of the infinitesimal parts $\Delta Z$ for the first layer and the second layer. Specifically, the flexural rigidity Mc of the beam with two layers can be obtained by the following formula (16) by using $Z_0$ of the formula (15).

$$\begin{aligned} M_c &= \int_0^a E_a(Z-Z_0)^2 dZ + \int_a^{a+b} E_b(Z-Z_0)^2 dZ \\ &= \frac{E_a}{3}[(Z-Z_0)^3]_0^a + \frac{E_b}{3}[(Z-Z_0)^3]_a^{a+b} \\ &= \frac{1}{3}E_a\{(a-Z_0)^3 - (-Z_0)^3\} + \frac{1}{3}E_b\{(a+b-Z_0)^3 - (a-Z_0)^3\} \end{aligned} \qquad (16)$$

By using the formula (16), the flexural rigidity Mc of the section, where the vibrating element 140 is overlapped with and attached to the top panel 120, and the rigidity ratio α between the flexural rigidity of the top panel 120 alone and the flexural rigidity of the section, where the vibrating element 140 is overlapped with and attached to the top panel 120, can be calculated from the Young's modulus, the thickness, and the like. Further, the wavelength λc at the section, where the vibrating element 140 is overlapped with and attached to the top panel 120, can be obtained from the formula (7).

Note that although the case of a two-layer structure of the top panel 120 and the vibrating element 140 has been described here, for example, even for a three-layer structure in which the vibrating element 140 is disposed on both surfaces of the top panel 120, the flexural rigidity Mc can be similarly obtained, and the present embodiment can be applied.

Figure 20:
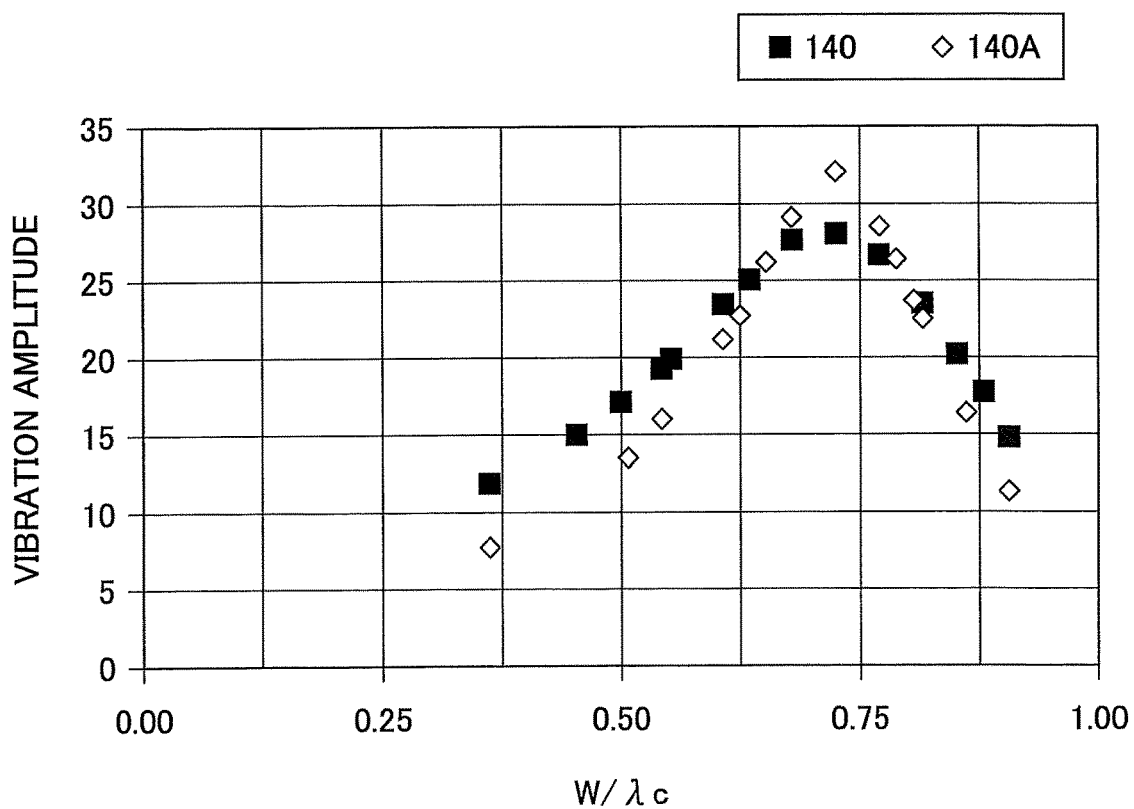
FIG. 20 is a diagram of plotting values of amplitude of the natural vibration of the top panel obtained by changing a value of a width of the vibrating element according to finite element analysis.

FIG. 20 illustrates results in which, when the thickness t of the glass used as the top panel 120 is 0.3 mm, the vibrating elements 140 and 140A are made of ceramic having a thickness of 0.3 mm, and the rigidity ratio α is 0.13, the width W is varied and analyzed by finite element analysis to plot values of amplitude of the natural vibration of the top panel 120.

FIG. 20 illustrates a graph for a case where the vibrating element 140 is arranged at the position of the second antinode from the positive side end part of the top panel 120 in the Y axis direction and for a case where the vibrating element 140A is arranged at the positive side end part of the top panel 120 in the Y axis direction.

As illustrated in FIG. 20, in both cases, the case in which the vibrating element 140 is arranged at the position of the second antinode from the positive side end part of the top panel 120 in the Y axis direction, and the case in which the vibrating element 140A is arranged at the positive side end part of the top panel 120 in the Y axis direction, the amplitude of the vibration generated at the top panel 120 is the maximum when W/λc is approximately 0.75. Note that it is found that the wavelength λc of the section where the vibrating element 140 is overlapped with and attached to the top panel 120 is larger, by approximately 20%, than the wavelength λp of the top panel 120 alone.

From the results illustrated in FIG. 20, it can be said that it is reasonable to estimate that the efficiency of vibration is favorable at the width W of 0.75 λc when the rigidity ratio α is relatively small.

Note that when the vibrating element 140 is arranged at the position of the second antinode from the positive side end part of the top panel 120 in the Y axis direction, the position of the vibrating element 140 is also important. FIG. 20 indicates the results analyzed with the arrangement in which the center of the vibrating element 140 is fitted in the position of an antinode of the natural vibration of the top panel 120 alone, when the vibrating element 140 is attached to the top panel 120. The simulation result shows that the amplitude of the natural vibration became large by setting the center of the vibrating element 140 in the position of an antinode of the natural vibration of the top panel 120 alone.

Therefore, although the vibration shape of the section, where the vibrating element 140 is overlapped with and attached to the top panel 120, differs from that of the top panel 120 alone due to the effect of the rigidity of the vibrating element 140, the position to which the vibrating element 140 is attached may be a position of an antinode calculated for the top panel 120 alone.

Figure 21:
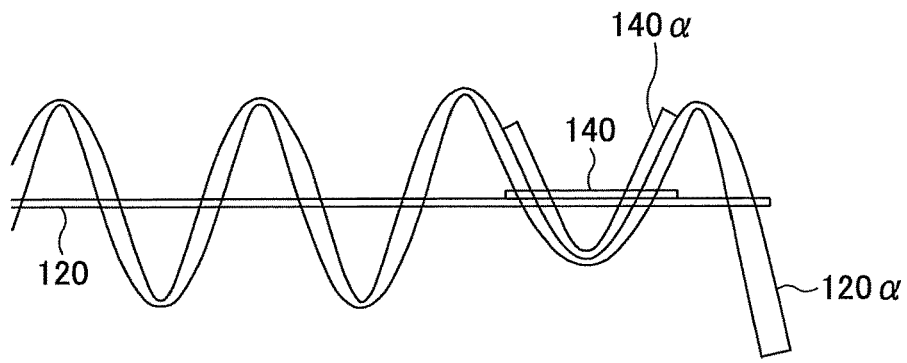
FIG. 21 is a diagram illustrating an example of a vibration shape of the analyzed results.

Further, FIG. 21 is a diagram illustrating an example of a vibration shape of the analyzed results. In FIG. 21, the vibration shape for when the top panel 120 to which the vibrating element 140 is attached is vibrated is indicated by the reference numerals 120a and 140a.

It is confirmed that the vibration shape in FIG. 21 of the section, where the vibrating element 140 is overlapped with and attached to the top panel 120, is near a vibration shape of a case obtained by taking only the section, where the vibrating element 140 is overlapped with and attached to the top panel 120, as being one with free ends.

Here, in the right end of the graph of FIG. 17, the ratio (rigidity ratio) a between the flexural rigidity Mp of the top panel 120 alone and the flexural rigidity Mc of the section, where the vibrating element 140 is overlapped with and attached to the top panel 120, is 1, and the flexural rigidity Mp is equal to the flexural rigidity Mc. That is, the rigidity of the beam with two layers is not varied by the vibrating element 140, and the vibration is the same as the natural vibration of the top panel 120 alone considered in FIG. 12 and FIG. 13.

Therefore, the wavelength λc in the section, where the vibrating element 140 is overlapped with and attached to the top panel 120, is the same as the wavelength λp in the case of the top panel 120 alone. Further, when the vibrating element 140 is arranged at the position of the second antinode from the positive side end part of the top panel 120 in the Y axis direction, the optimum value of the width W of the vibrating element 140 is 0.5 λc, and when the vibrating element 140 is arranged at the end of the top panel 120, the optimum value of the width W of the vibrating element 140 is 0.625 λc.

As described above, with respect to the conditions at the left end (α=0) and the right end (α=1) in FIG. 17, the optimum width W of the vibrating element 140 can be estimated.

With respect to the conditions between the left end (α=0) and the right end (α=1) in FIG. 17, the optimum width is estimated to change, as illustrated in FIG. 17, linearly with respect to the rigidity ratio α as indicated by the formula (5) and the formula (6). In the following, the validity of the above estimation is verified by using results of finite element analysis with respect to four types of values of rigidity ratios α.

The conditions of the four cases using the four types of values of rigidity ratios α are as follows.
Case 1: α=0.13, the thickness t of the top panel 120=0.3 mm, the thickness t of the vibrating element 140=0.3 mm
Case 2: α=0.2, the thickness t of the top panel 120=0.42 mm, the thickness t of the vibrating element 140=0.3 mm
Case 3: α=0.35, the thickness t of the top panel 120=0.7 mm, the thickness t of the vibrating element 140=0.3 mm
Case 4: α=0.68, the thickness t of the top panel 120=0.7 mm, the thickness t of the vibrating element 140=0.1 mm The results of the case 1 are as illustrated in FIG. 20. Further, the case 3 will be described with reference to FIG. 22 and FIG. 23. Further, the case 2 will be described with reference to FIG. 24.

Figure 22:
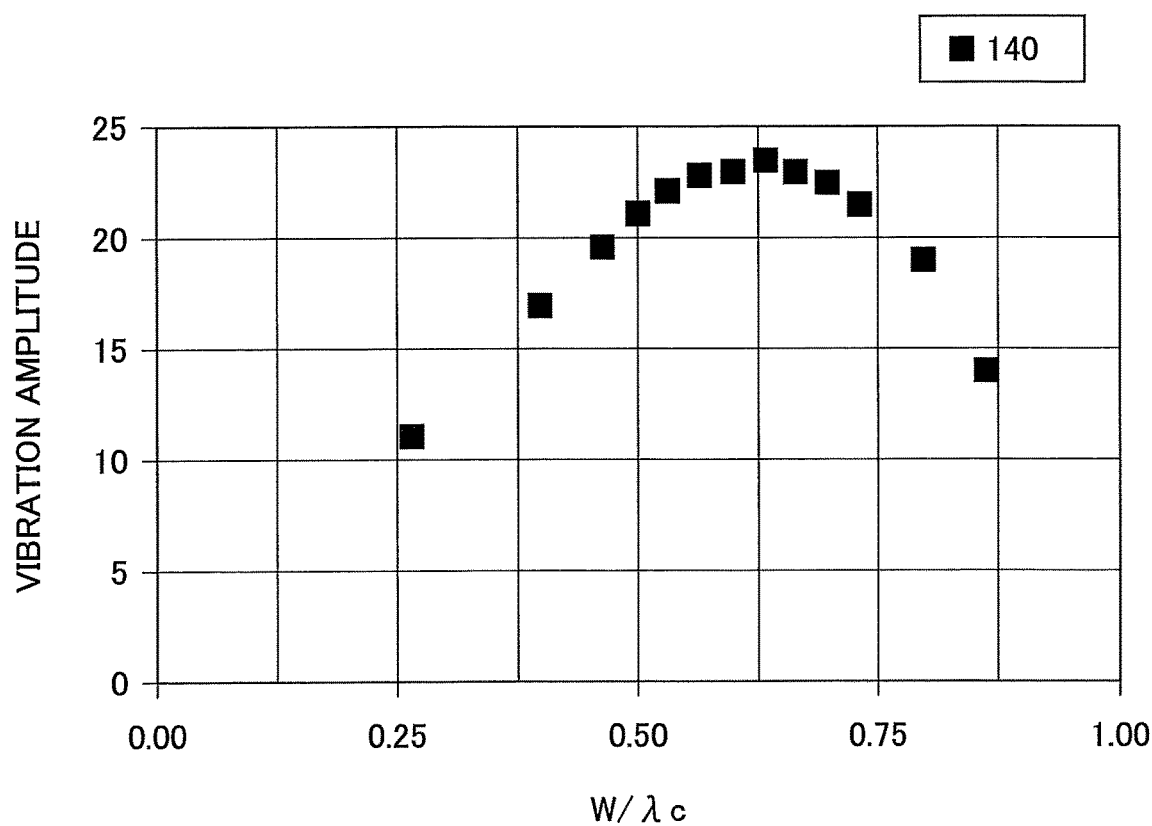
FIG. 22 is a diagram illustrating amplitude of the natural vibration with respect to the width of the vibrating element in a case in which the vibrating element is arranged at the position of a second antinode from the end part of the top panel.
Figure 23:
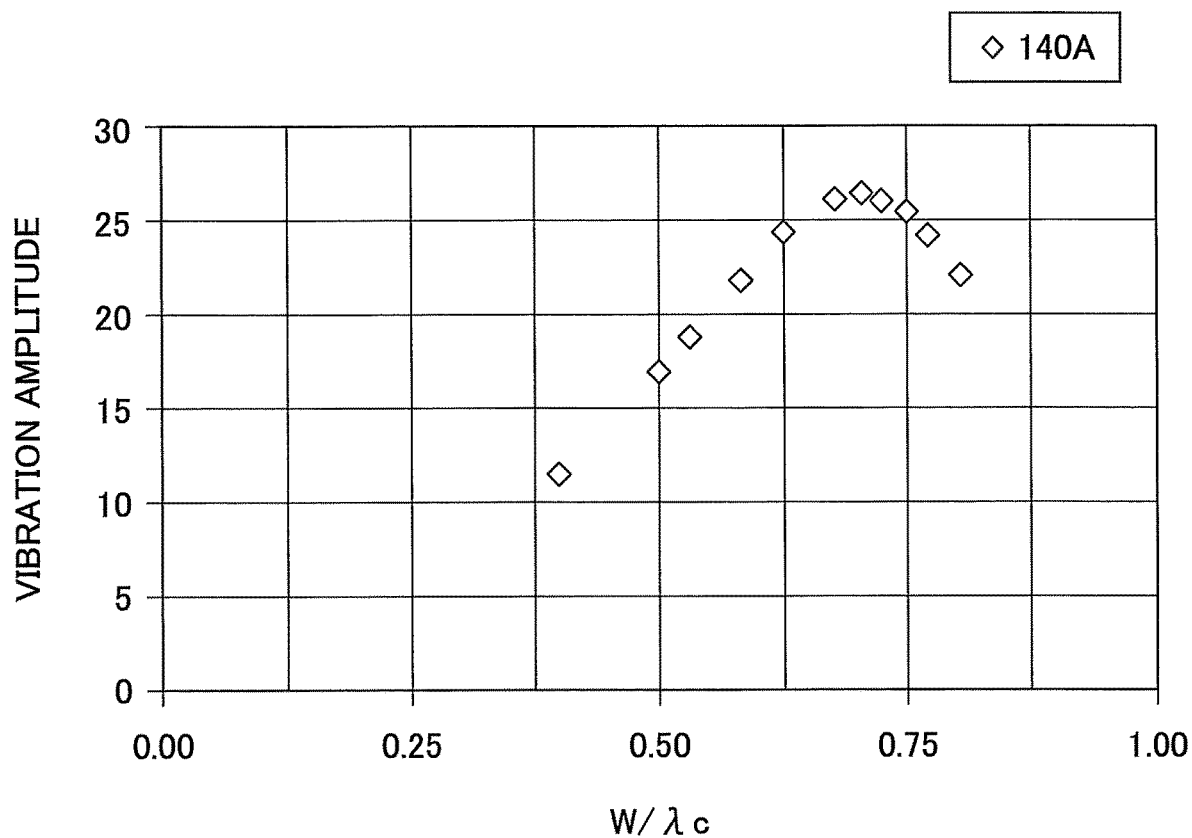
FIG. 23 is a diagram illustrating an analysis result in a case where the vibrating element is arranged at the end part of the top panel.
Figure 24:
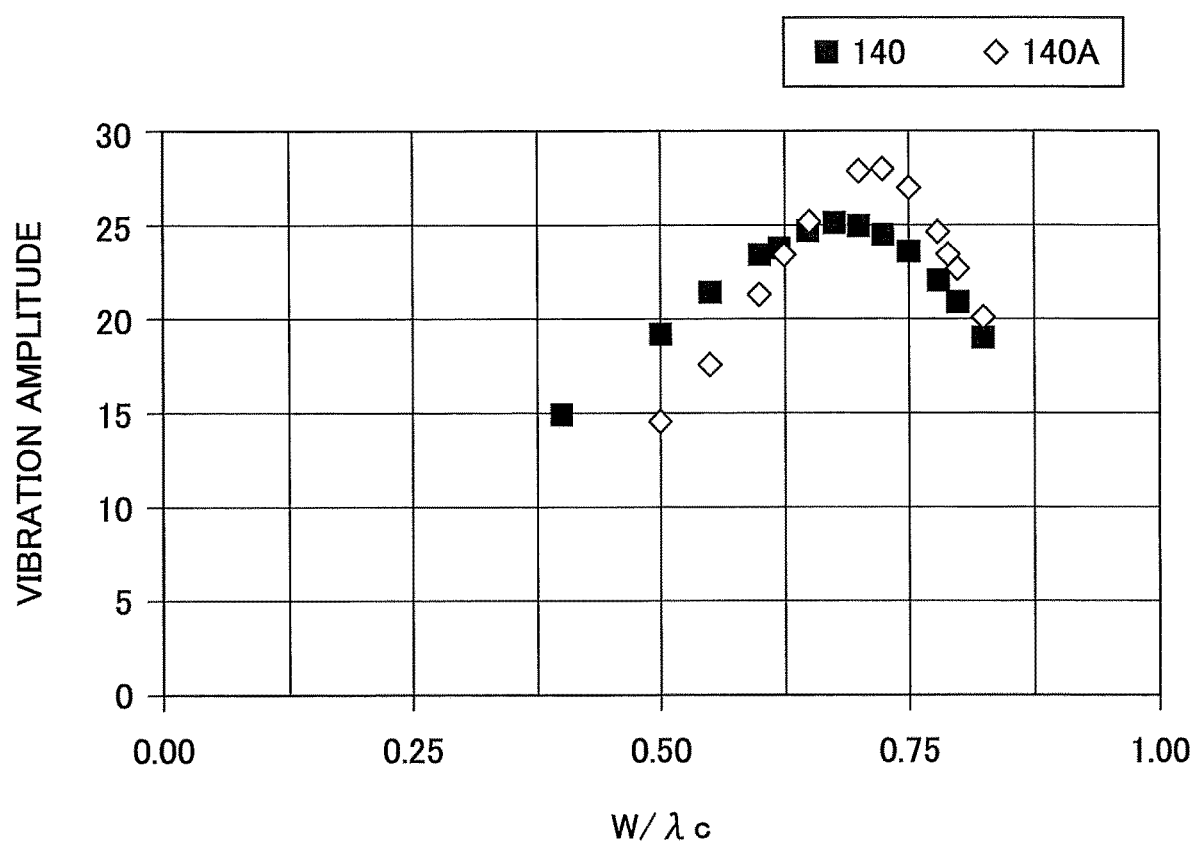
FIG. 24 is a diagram illustrating amplitude of the natural vibration with respect to the width of the vibrating element.

FIG. 22 is a diagram illustrating amplitude of the natural vibration with respect to the width W in the case 3 in which the vibrating element 140 is arranged at the position of the second antinode from the positive side end part of the top panel 120 in the Y axis direction. FIG. 23 is a diagram illustrating an analysis result where the vibrating element 140A is arranged at the end part of the top panel 120. FIG. 24 is a diagram illustrating, for the case 2, amplitude of the natural vibration with respect to the width W for when the vibrating element 140 is arranged at the position of the second antinode from the positive side end part of the top panel 120 in the Y axis direction and for when the vibrating element 140A is arranged at the end part of the top panel 120.

In FIG. 22, the amplitude is the maximum when the width W is 0.63 λc. Further, in FIG. 23, the amplitude is the maximum when the width W is 0.71 λc. In FIG. 24, in the case where the vibrating element 140 is disposed at the position of the second antinode from the positive side end part of the top panel 120 in the Y axis direction, the amplitude is the maximum when the width W is 0.65 λc. In FIG. 24, in the case where the vibrating element 140A is disposed at the end part of the top panel 120, the amplitude is the maximum when the width W is 0.70 λc.

Figure 25:
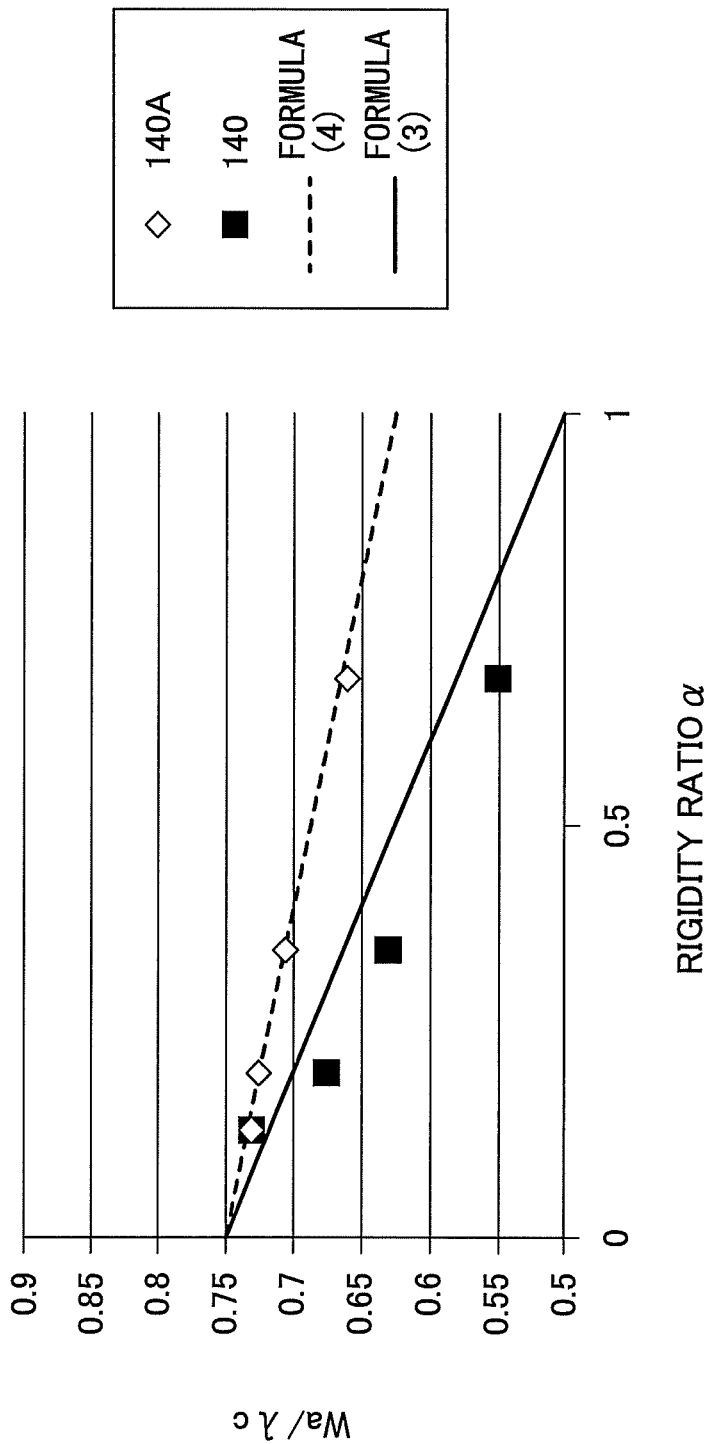
FIG. 25 is a diagram illustrating results of plotting, with respect to the flexural rigidity ratio, the width at which the maximum amplitude is obtained.

FIG. 25 is a diagram illustrating, for the cases 1 to 4, results of plotting, with respect to the flexural rigidity ratio α, the width W at which the maximum amplitude is obtained. In FIG. 25, straight lines corresponding to the formulas (5) and (6) are also displayed.

The results illustrated in FIG. 25 indicate that the width W that gives the maximum amplitude obtained by the finite element analysis substantially matches the width W of the formula (5) and the formula (6), and indicate that the estimation that the optimum width W changes linearly with respect to the flexural rigidity a is valid.

Accordingly, from the above described results, when the Young's modulus and the thickness of the top panel 120 and the Young's modulus and the thickness of the vibrating element 140 are given, and the frequency of vibration of the top panel 120 is selected, the ratio (rigidity ratio) a between the flexural rigidity Mp of the top panel 120 alone and the flexural rigidity Mc of the section, where the vibrating element 140 is overlapped with and attached to the top panel 120, can be calculated. Further, the wavelength λc of the section, where the vibrating element 140 is overlapped with and attached to the top panel 120, can be calculated.

Then, by obtaining the optimum width W by the formula (5) or the formula (6), it is possible to realize the electronic device 100 that can efficiently generate the natural vibration at the top panel 120.

Next, in consideration of the above description, a range of the width W of the vibrating element 140 by which the natural vibration in the ultrasound frequency band can be favorably obtained at the top panel 120 will be discussed.

When the vibrating element 140 is attached to the position of the second antinode from the positive side end part of the top panel 120 in the Y axis direction, the amplitude of the natural vibration can be increased by setting the width W such that a large amplitude is obtained as illustrated in FIG. 20 and FIG. 22.

With an amplitude obtained when the width W is 0.5 λc as a reference, an amplitude greater than or equal to this amplitude can be obtained, for example, in the range of 0.5 λc≤W≤0.88 λc in FIG. 20. The reason why the amplitude obtained when the width W is 0.5 λc is used as a reference is that, in ignoring the effect of the vibrating element on the rigidity and the like, the optimum value of the width W of the vibrating element 140 is 0.5 λc when the vibrating element 140 is arranged at the position of the second antinode from the positive side end part of the top panel 120 in the Y axis direction.

Figure 26:
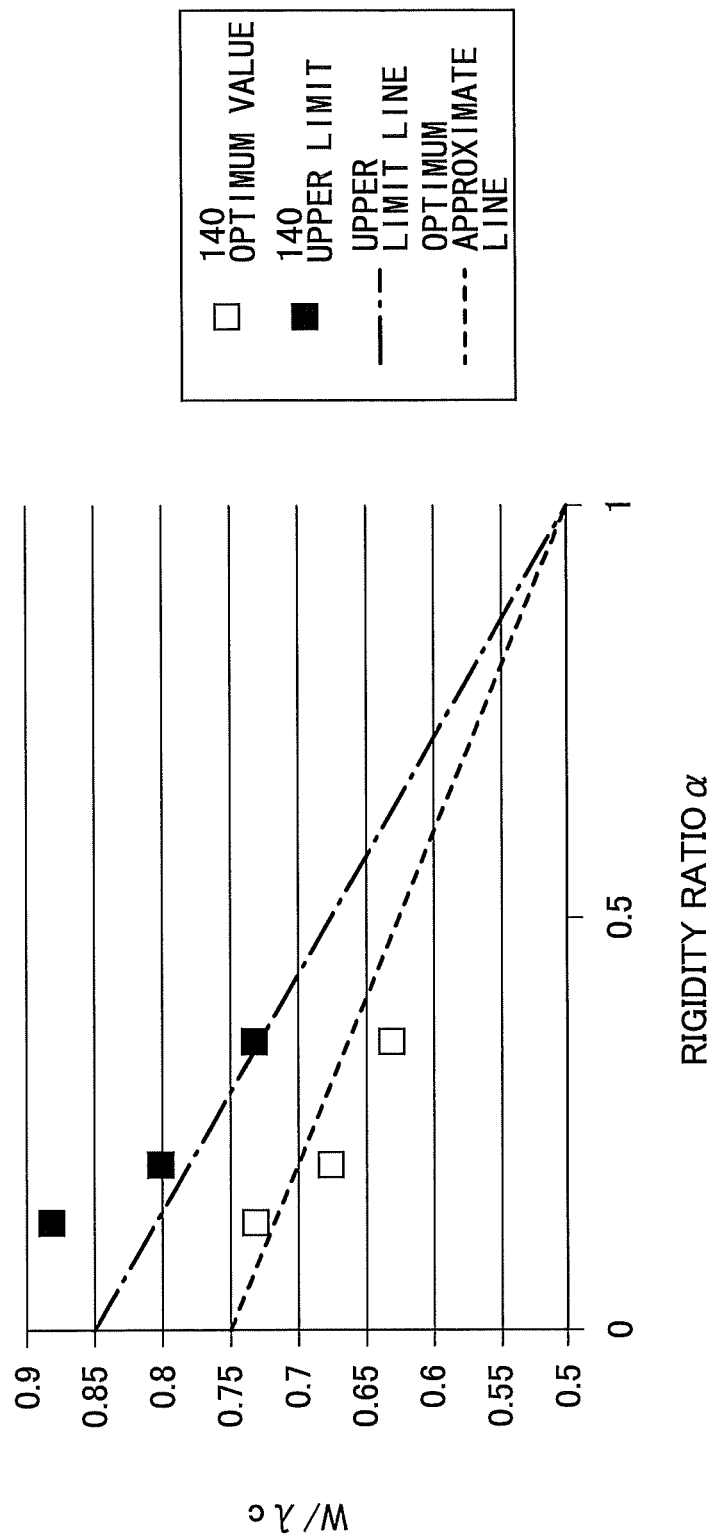
FIG. 26 is a diagram illustrating properties of plotting a relationship between the width/wavelength of the vibrating element and the flexural rigidity ratio.

FIG. 26 illustrates, for the cases 1 to 3, properties of plotting the upper limit values of the range of the width W at which an amplitude greater than or equal to the amplitude at the width W of 0.5 λc is obtained. Note that in the case 4 where the rigidity ratio α=0.68, the maximum value of the amplitude is obtained when the width W is 0.55 λc. However, because the amplitude increases only slightly in comparison with that of the case where the width W is 0.5 λc, it is omitted in FIG. 26.

Further, the upper limit lines illustrated in FIG. 26 are properties fitted to the upper limit values of the range of the width W in the cases 1 to 3 under the condition that W=0.5 λc when α=1, and expressed by the following formula (17).

$$W=(0.85-0.35\alpha)\lambda c \tag{17}$$

From the formula (17), in the electronic device 100 in which the vibrating element 140 is arranged at the position of the second antinode from the positive side end part of the top panel 120 in the Y axis direction, a large amplitude is expected to be obtained within the range given by the following formula (18).

$$0.5\lambda c \leq W \leq (0.85-0.35\alpha)\lambda c \tag{18}$$

Similarly, when the vibrating element 140 is arranged at the end of a free end top panel 120, the amplitude of the natural vibration can be increased by setting the width W such that a large amplitude is obtained as illustrated in FIG. 20 and FIG. 23.

With an amplitude obtained when the width W is 0.625 λc as a reference, an amplitude greater than or equal to this amplitude can be obtained, for example, in the range of 0.5 λc≤W≤0.81 λc in FIG. 23. The reason why the amplitude obtained when the width W is 0.625 λc is used as a reference is that, in ignoring the effect of the vibrating element on the rigidity and the like, the optimum value of the width W of the vibrating element 140 is 0.625 λc when the vibrating element 140 is arranged at the positive side end part of the top panel 120 in the Y axis direction.

Figure 27:
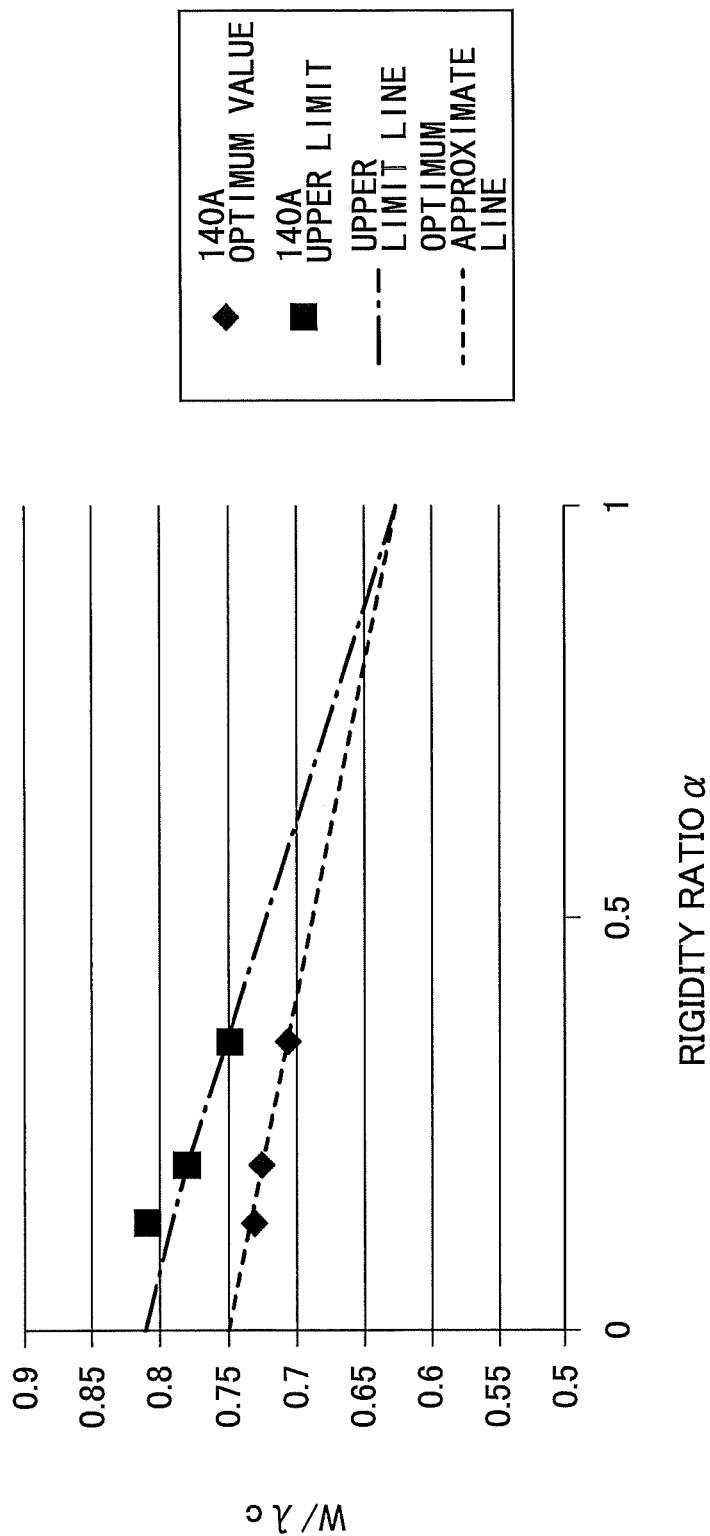
FIG. 27 is a diagram illustrating properties of plotting a relationship between the width/wavelength of the vibrating element and the flexural rigidity ratio.

FIG. 27 illustrates, for the cases 1 to 3, properties of plotting the upper limit values of the range of the width W at which an amplitude greater than or equal to the amplitude at the width W of 0.625 λc is obtained. Note that in the case 4 where the rigidity ratio α=0.68, the maximum value is obtained when the width W is 0.66 λc. However, because the amplitude increases only slightly from that of the case where the width W is 0.625 λc, it is omitted.

Further, the upper limit lines depicted in FIG. 27 are properties fitted to the upper limit values of the range of the width W in the cases 1 to 3 under the condition that W=0.625 λc when α=1, and expressed by the following formula (19).

$$W=(0.81-0.185\alpha)\lambda c \quad (19)$$

That is, in the electronic device 100 in which the vibrating element 140 is arranged at the end of the top panel 120, a large amplitude is expected to be obtained within the range given by the following formula (18).

$$0.625\lambda c \leq W \leq (0.81-0.185\alpha)\lambda c \quad (20)$$

A configuration in which the rigidity ratio α is close to 1 does not appreciably differ, in a width W considered as optimum in the present embodiment, from the configuration illustrated in FIG. 12 in which the width of the vibrating element 140 in the Y axis direction is set to be 0.5λ and the configuration illustrated in FIG. 13 in which the width of the vibrating element 140A in the Y axis direction is set to be 0.625λ, and its amplitude increase effect is slight.

Hence, the present embodiment is effective when being applied to a configuration where the rigidity ratio α is small, in particular, a configuration where the rigidity ratio α is less than or equal to 0.35. In order to reduce the rigidity ratio α, a configuration in which the thickness of the top panel 120 is reduced or a configuration in which the thickness of the vibrating element 140 is increased may be adopted. Both of the configurations are considered not to be disadvantageous for generating a vibration at the top panel 120 and but to work advantageously.

Therefore, the electronic device 100 in which the rigidity ratio α is reduced and the width W is set to be in the range expressed by the formula (19) or the formula (20) can provide a favorable tactile sensation.

Note that when the vibrating element 140 is arranged at the position of the second antinode from the positive side end part of the top panel 120 in the Y axis direction, an amplitude of the top panel 120 obtained by setting the width W to be in the range expressed by the formula (18) becomes an amplitude equal to or higher than an amplitude obtained when the width W is 0.5 λc, but does not necessarily become equal to or higher than an amplitude obtained when the vibrating element 140 whose width W is greater than or equal to 0.625 λc is installed at the positive side end part of the top panel 120 in the Y axis direction.

Especially in the case 4, when comparing FIG. 22 with FIG. 23, an amplitude in a case where the vibrating element 140 is arranged at the position of the second antinode from the positive side end part of the top panel 120 in the Y axis direction is smaller than an amplitude in a case where the vibrating element 140 is arranged at the positive side end part of the top panel 120 in the Y axis direction.

However, when the top panel 120 is fixed to the housing 110, there may be a case where the vibrating element 140 cannot be arranged at the positive side end part of the top panel 120 in the Y axis direction. In such a case, the vibrating element 140 is arranged at the position of the second antinode from the positive side end part of the top panel 120 in the Y axis direction.

Therefore, even if an amplitude obtained when the vibrating element 140 is arranged at the position of the second antinode from the positive side end part of the top panel 120 in the Y axis direction is smaller than an amplitude obtained when the vibrating element 140 is arranged at the positive side end part of the top panel 120 in the Y axis direction, it is extremely important to consider, when arranging the vibrating element 140 at the position of the second antinode from the positive side end part of the top panel 120 in the Y axis direction, a width W such that an amplitude sufficient for favorable vibration is obtained.

For example, when the end of the top panel 120 is firmly fixed to the housing 110 with the double-faced adhesive tape 130 or the like, the end part of the top panel 120 is a fixed end. In such a case, the end part of the top panel 120 differs, in conditions, from the end part of the top panel in FIG. 13, and the formula (20) cannot be applied. However, by arranging the vibrating element 140 at an antinode of the vibration of the top panel 120 and by setting a width W obtained in the formula (18), an amplitude sufficient for a favorable vibration can be obtained similarly to the case in which the vibrating element 140 is arranged at the position of the second antinode from the positive side end part of a free end top panel 120 in the Y axis direction.

As described above, according to the electronic device 100 of the embodiment, the width of the vibrating element 140 in the Y axis direction is set by using the rigidity ratio α between the flexural rigidity Mc of the section, where the top panel 120 and the vibrating element 140 are overlapped, and the flexural rigidity Mp of the section of the top panel 120 alone (=Mp/Mc). Thereby, it is possible to provide the electronic device 100 that can provide a favorable tactile sensation.

Further, because it is possible to generate the natural vibration in the ultrasound frequency band of the top panel 120 to change the kinetic friction force applied to the user's fingertip, it is possible to provide a favorable tactile sensation to the user.

Further, the electronic device 100 of the embodiment generates the driving signal by causing the amplitude modulator 320 to modulate only the amplitude of the sinusoidal wave, which is in the ultrasound frequency band, generated by the sinusoidal wave generator 310. The frequency of the sinusoidal wave in the ultrasound frequency band generated by the sinusoidal wave generator 310 is equal to the natural vibration frequency of the top panel 120. Further, this natural vibration frequency is set in consideration of the vibrating element 140.

That is, the driving signal is generated by the amplitude modulator 320 modulating only the amplitude of the sinusoidal wave in the ultrasound frequency band generated by the sinusoidal wave generator 310, without modulating the frequency or the phase of the sinusoidal wave.

Accordingly, it is possible to generate, at the top panel 120, the natural vibration in the ultrasound frequency band of the top panel 120 and to decrease with certainty the kinetic friction coefficient applied to the user's finger tracing the surface of the top panel 120 by utilizing the layer of air provided by the squeeze effect. Further, it is possible to provide a favorable tactile sensation to the user as if a concavo-convex portion were present on the surface of the top panel 120 by utilizing the Sticky-band Illusion effect or the Fishbone Tactile Illusion effect.

In the embodiment described above, in order to provide a tactile sensation to the user as if a concave-convex portion were present on the top panel 120, the vibrating element 140 is switched on/off. Turning off the vibrating element 140 is equal to setting the amplitude value, represented by the driving signal used to drive the vibrating element 140, to be zero.

However, it is not necessary to turn the vibrating element 140 from on to off in order to provide such tactile sensations. For example, the vibrating element 140 may be driven to decrease the amplitude instead of turning off the vibrating element 140. For example, similar to turning the vibrating element 140 from on to off, a tactile sensation may be provided to the user as if a concave-convex portion were present on the top panel 120 by decreasing the amplitude to approximately one-fifth.

In this case, the vibrating element 140 is driven by the driving signal such that the intensity of the vibration of the vibrating element 140 is changed. As a result, the intensity of the natural vibration generated at the top panel 120 is changed, and it is possible to provide the tactile sensation to the user's fingertip as if a concavo-convex portion were present.

When the vibrating element 140 is turned off to weaken the vibration in order to change the intensity of the vibration of the vibrating element 140, on/off of the vibrating element 140 is switched. Switching on/off the vibrating element 140 means driving the vibrating element 140 intermittently.

Here, variation examples of the electronic device 100 of the embodiment (see FIG. 3) will be described with reference to FIG. 28 to FIG. 31.

Figure 28:
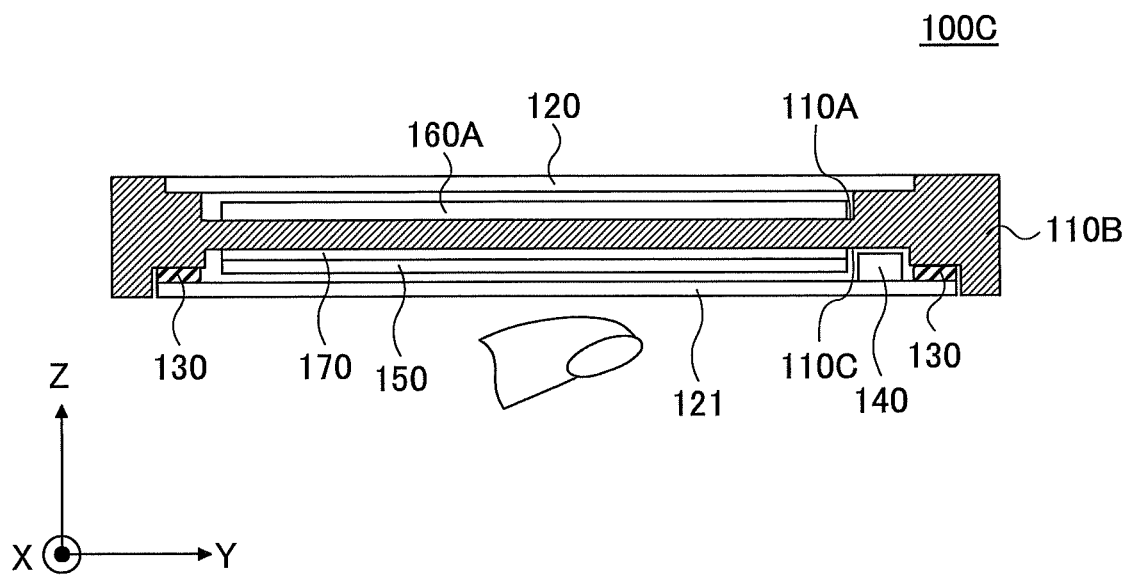
FIG. 28 is a diagram illustrating a cross section of an electronic device according to a variation example of the embodiment.

FIG. 28 is a diagram illustrating a cross section of an electronic device 100C according to a variation example of the embodiment. The cross section illustrated in FIG. 28 corresponds to a cross section taken along the line A-A as illustrated in FIG. 3. In FIG. 28, an XYZ coordinate system, which is an orthogonal coordinate system, similar to that illustrated in FIG. 3 is defined.

The electronic device 100C includes a housing 110B, the top panel 120, a panel 121, the double-faced adhesive tape 130, the vibrating element 140, the touch panel 150, a display panel 160A, and the substrate 170.

The electronic device 100C has a configuration in which the touch panel 150 of the electronic device 100 illustrated in FIG. 3 is provided on the back face side (the negative side in the Z axis direction). Thus, in comparison with the electronic device 100 illustrated in FIG. 3, the double-faced adhesive tape 130, the vibrating element 140, the touch panel 150, and the substrate 170 are disposed on the back face side.

A recessed portion 110A at the positive side in the Z axis direction and a recessed portion 110C at the negative side in the Z axis direction are formed on the housing 110B. The display panel 160A is disposed inside the recessed portion 110A and is covered with the top panel 120. The substrate 170 and the touch panel 150 are stacked and disposed inside the recessed portion 110C. The panel 121 is secured to the housing 110B with the double-faced adhesive tape 130. The vibrating element 140 is disposed on a positive side surface of the top panel 121 in the Z axis direction.

When on/off of the vibrating element 140 is switched to generate the natural vibration in the ultrasound frequency band at the panel 121 in accordance with a manipulation input performed on the panel 121 in the electronic device 100C illustrated in FIG. 28, in a way similar to that of the electronic device 100 illustrated in FIG. 3, the electronic device 100C with which a user can sense tactile sensations corresponding to an image displayed on the display panel 160A through the user's fingertip can be provided.

Although FIG. 28 illustrates the electronic device 100C in which the touch panel 150 is provided at the back surface side, the touch panel 150 may be provided for each of the front surface side and the back surface side by combining the structure illustrated in FIG. 3 and the structure illustrated in FIG. 28.

Figure 29:
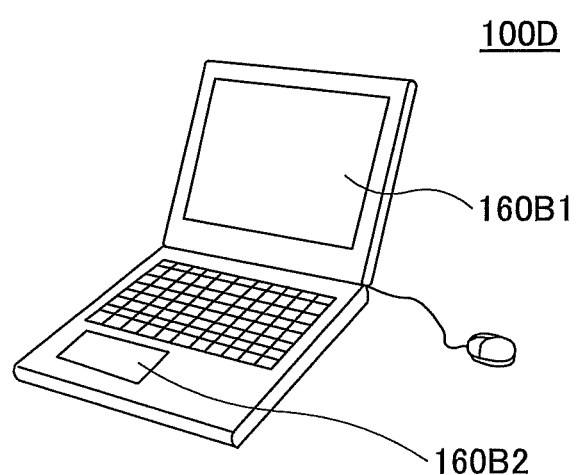
FIG. 29 is a diagram illustrating an electronic device according to a variation example of the embodiment.

FIG. 29 is a diagram illustrating an electronic device 100D of a variation example of the embodiment. The electronic device 100D is a notebook Personal Computer (PC).

The PC 100D includes a display panel 160B1 and a touch pad 160B2.

Figure 30:
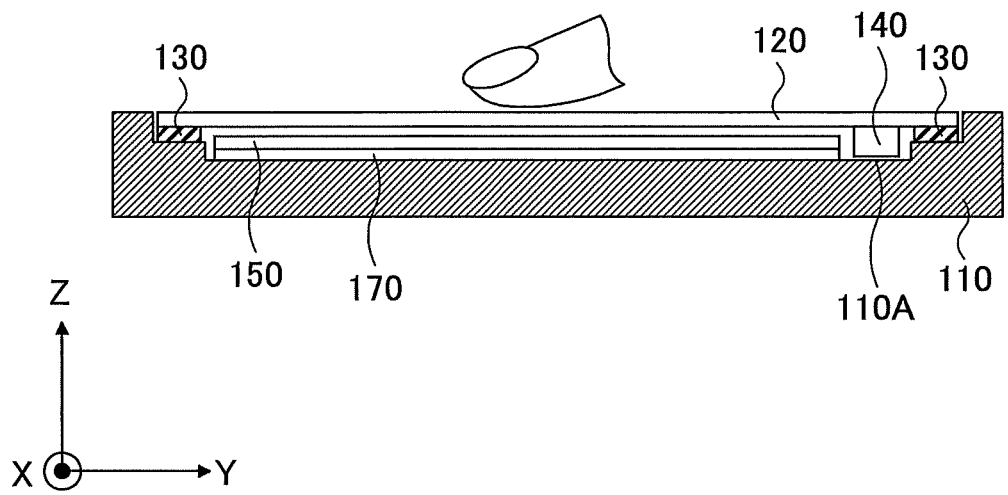
FIG. 30 is a diagram illustrating a cross section of a touch pad of the electronic device according to the variation example of the embodiment.

FIG. 30 is a diagram illustrating a cross section of the touch pad 160B2 of the electronic device 100D of the variation example of the embodiment. The cross section illustrated in FIG. corresponds to a cross section taken along the line A-A as illustrated in FIG. 3. In FIG. 30, an XYZ coordinate system, which is an orthogonal coordinate system, similar to that illustrated in FIG. 3 is defined.

The touch pad 160B2 has a configuration in which the display panel 160 is omitted from the electronic device 100 illustrated in FIG. 3.

By switching on/off the vibrating element 140 to generate the natural vibration in the ultrasound frequency band at the top panel 120 in accordance with a manipulation input performed on the touch pad 160B2 in the electronic device 100D as a PC as illustrated in FIG. 29, in a way similar to that of the electronic device 100 illustrated in FIG. 3, an operational feeling can be provided to the user's fingertip through tactile sensations in accordance with an amount of movement of the manipulation input performed on the touch pad 160B2.

Further, by providing the vibrating element 140 at the back surface of the display panel 160B1, in a way similar to that of the electronic device 100 illustrated in FIG. 3, an operational feeling can be provided to the user's fingertip through tactile sensations in accordance with an amount of movement of the manipulation input performed on the display panel 160B1. In this case, the electronic device 100 illustrated in FIG. 3 may be provided instead of the display panel 160B1.

Figure 31:
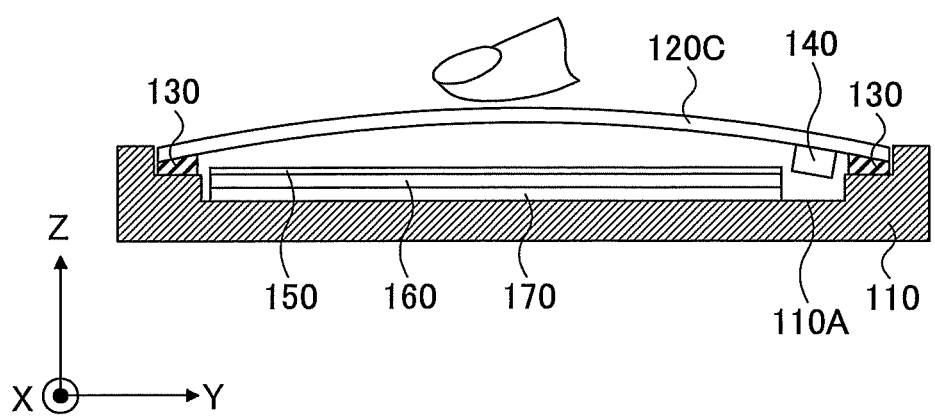
FIG. 31 is a diagram illustrating a cross section of an electronic device according to a variation example of the embodiment.

FIG. 31 is a diagram illustrating a cross section of an electronic device 100E of a variation example of the embodiment.

The electronic device 100E includes the housing 110, a top panel 120C, the double-faced adhesive tape 130, the vibrating element 140, the touch panel 150, the display panel 160 and the substrate 170.

Except for the top panel 120C being a curved glass, the electronic device 100E illustrated in FIG. 31 has a configuration similar to that of the electronic device 100 of the embodiment illustrated in FIG. 3.

The top panel 120C is curved such that its center portion in plan view protrudes towards a positive side in the Z axis direction. Although FIG. illustrates a cross sectional shape of the top panel 120C in the YZ plane, a cross sectional shape in a XZ plane is similar to the cross sectional shape in the YZ plane.

In this way, it is possible to provide favorable tactile sensations by using the top panel 120C of the curved glass. In particular, it is effective for a case where a shape of an actual object to be displayed as an image is curved.

Although examples of electronic devices according to the embodiments of the present invention have been described above, the present invention is not limited to the embodiments specifically disclosed and various variations and modifications may be made without departing from the scope of the claims.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. An electronic device comprising:
a top panel having a manipulation surface;
a position detector configured to detect a position of a manipulation input performed on the manipulation surface;
a vibrating element attached to the top panel and configured to generate a vibration at the manipulation surface; and
a drive controlling part configured to drive the vibrating element by using a driving signal for generating a natural vibration in an ultrasound frequency band at the manipulation surface, the drive controlling part being configured to drive the vibrating element such that an intensity of the natural vibration is changed in accordance with the position of the manipulation input performed on the manipulation surface and a time change degree of the position,
wherein a width of the vibrating element in a direction in which an amplitude of the natural vibration changes is set based on a ratio of a flexural rigidity of the top panel to a flexural rigidity of the top panel and the vibrating element at a portion where the vibrating element is attached to the top panel,
wherein, in the direction in which the amplitude of the natural vibration changes, the vibrating element is attached, inward with respect to an end part of the top panel, to a position corresponding to an antinode of the natural vibration, and
wherein a width W of the vibrating element satisfies $0.5\lambda c \leq W \leq (0.85-0.35\alpha)\lambda c$ where the ratio is $\alpha$ and $\lambda c$ is a wavelength of the natural vibration at a section where the top panel and the vibrating element are overlapped.

2. The electronic device according to claim 1, wherein the ratio is less than or equal to 0.35.

3. An electronic device comprising:
a top panel having a manipulation surface;
a position detector configured to detect a position of a manipulation input performed on the manipulation surface;
a vibrating element attached to the top panel and configured to generate a vibration at the manipulation surface; and
a drive controlling part configured to drive the vibrating element by using a driving signal for generating a natural vibration in an ultrasound frequency band at the manipulation surface, the drive controlling part being configured to drive the vibrating element such that an intensity of the natural vibration is changed in accordance with the position of the manipulation input performed on the manipulation surface and a time change degree of the position,
wherein a width of the vibrating element in a direction in which an amplitude of the natural vibration changes is set based on a ratio of a flexural rigidity of the top panel to a flexural rigidity of the top panel and the vibrating element at a portion where the vibrating element is attached to the top panel,
wherein the vibrating element is attached to an end part of the top panel in the direction in which the amplitude of the natural vibration changes, and
wherein a width W of the vibrating element satisfies $0.625\lambda c \leq W \leq (0.81-0.185\alpha)\lambda c$ where the ratio is $\alpha$ and $\lambda c$ is a wavelength of the natural vibration at a section where the top panel and the vibrating element are overlapped.

* * * * *